US008634026B2

(12) United States Patent
Hara et al.

(10) Patent No.: US 8,634,026 B2
(45) Date of Patent: Jan. 21, 2014

(54) DIGITAL BROADCAST RECEIVING APPARATUS

(75) Inventors: Jiro Hara, Tokyo (JP); Kohei Yamamoto, Tokyo (JP)

(73) Assignee: Sony Corporation, Tokyo (JP)

(*) Notice: Subject to any disclaimer, the term of this patent is extended or adjusted under 35 U.S.C. 154(b) by 758 days.

(21) Appl. No.: 12/203,300

(22) Filed: Sep. 3, 2008

(65) Prior Publication Data

US 2009/0064239 A1 Mar. 5, 2009

(30) Foreign Application Priority Data

Sep. 4, 2007 (JP) ................................ P2007-229476

(51) Int. Cl.
| H04N 3/27 | (2006.01) |
| H04N 5/44 | (2011.01) |
| H04N 5/50 | (2006.01) |
| H04N 7/20 | (2006.01) |
| H04N 5/445 | (2011.01) |
| G06F 3/00 | (2006.01) |
| G06F 13/00 | (2006.01) |
| H04L 27/06 | (2006.01) |

(52) U.S. Cl.
USPC ............. 348/554; 348/725; 348/732; 725/68; 725/49; 375/344

(58) Field of Classification Search
USPC ............................................ 348/554; 725/56
See application file for complete search history.

(56) References Cited

U.S. PATENT DOCUMENTS

| 5,982,411 A | * | 11/1999 | Eyer et al. ........................ 725/49 |
| 2002/0021371 A1 | * | 2/2002 | Konishi et al. ................. 348/678 |
| 2002/0140868 A1 | * | 10/2002 | Yamagata ...................... 348/725 |
| 2005/0088575 A1 | * | 4/2005 | Ishida ............................. 348/705 |
| 2006/0061694 A1 | * | 3/2006 | Oh .................................. 348/732 |
| 2006/0135099 A1 | * | 6/2006 | Hoda et al. ................... 455/179.1 |
| 2007/0052867 A1 | * | 3/2007 | Ohiwa ............................ 348/731 |
| 2007/0154184 A1 | * | 7/2007 | Hatanaka et al. ................ 386/98 |
| 2008/0013651 A1 | * | 1/2008 | Taya ............................... 375/344 |
| 2008/0295134 A1 | * | 11/2008 | Taga et al. ........................ 725/56 |

FOREIGN PATENT DOCUMENTS

| JP | 2000-295053 A | * | 10/2000 | ............... H03G 3/20 |
| JP | 2003 125302 | | 4/2003 | |
| JP | 2003-125302 A | * | 4/2003 | ............... H04N 5/44 |

* cited by examiner

Primary Examiner — Jefferey Harold
Assistant Examiner — Sean Haiem
(74) Attorney, Agent, or Firm — Oblon, Spivak, McClelland, Maier & Neustadt, L.L.P.

(57) ABSTRACT

Disclosed herein is a digital broadcast receiving apparatus configured to receive terrestrial digital television broadcasting and satellite digital broadcasting, including: a terrestrial digital tuner; a satellite digital tuner; a demodulating block configured to demodulate a reception signal of the terrestrial digital television broadcasting with an output supplied from the terrestrial digital tuner, and, at the same time, demodulate a reception signal of the satellite digital broadcasting with an output supplied from the satellite digital tuner; a terrestrial digital tuner control block; a satellite digital tuner control block; and a switching block configured to switch output terminals of the demodulating block in accordance with a positional arrangement of the terrestrial digital tuner and the satellite digital tuner relative to the demodulating block.

10 Claims, 18 Drawing Sheets

FIG. 13

| NO. 121 | SWITCHING SIGNAL A 32 | SWITCHING SIGNAL B 33 | TERMINAL A 26 | TERMINAL B 27 | TERMINAL C 28 | TERMINAL D 29 |
|---|---|---|---|---|---|---|
| 1 | 0 | 0 | AGC SIGNAL TO TUNER FOR TERRESTRIAL DIGITAL BROADCASTING | SERIAL COMMUNICATIONS SIGNAL TO TUNER FOR TERRESTRIAL DIGITAL BROADCASTING | AGC SIGNAL TO TUNER FOR SATELLITE DIGITAL BROADCASTING | SERIAL COMMUNICATIONS SIGNAL TO TUNER FOR SATELLITE DIGITAL BROADCASTING |
| 2 | 1 | 0 | AGC SIGNAL TO TUNER FOR SATELLITE DIGITAL BROADCASTING | SERIAL COMMUNICATIONS SIGNAL TO TUNER FOR TERRESTRIAL DIGITAL BROADCASTING | AGC SIGNAL TO TUNER FOR TERRESTRIAL DIGITAL BROADCASTING | SERIAL COMMUNICATIONS SIGNAL TO TUNER FOR SATELLITE DIGITAL BROADCASTING |
| 3 | 0 | 1 | AGC SIGNAL TO TUNER FOR TERRESTRIAL DIGITAL BROADCASTING | SERIAL COMMUNICATIONS SIGNAL TO TUNER FOR SATELLITE DIGITAL BROADCASTING | AGC SIGNAL TO TUNER FOR SATELLITE DIGITAL BROADCASTING | SERIAL COMMUNICATIONS SIGNAL TO TUNER FOR TERRESTRIAL DIGITAL BROADCASTING |
| 4 | 1 | 1 | AGC SIGNAL TO TUNER FOR SATELLITE DIGITAL BROADCASTING | SERIAL COMMUNICATIONS SIGNAL TO TUNER FOR SATELLITE DIGITAL BROADCASTING | AGC SIGNAL TO TUNER FOR TERRESTRIAL DIGITAL BROADCASTING | SERIAL COMMUNICATIONS SIGNAL TO TUNER FOR TERRESTRIAL DIGITAL BROADCASTING |

FIG.14

| NO. 131 | SWITCHING SIGNAL A 62 | SWITCHING SIGNAL B 63 | TERMINAL A 56 | TERMINAL B 57 | TERMINAL C 58 | TERMINAL D 59 |
|---|---|---|---|---|---|---|
| 1 | "L" | "L" | AGC SIGNAL TO TUNER FOR TERRESTRIAL DIGITAL BROADCASTING | SERIAL COMMUNI-CATIONS SIGNAL TO TUNER FOR TERRESTRIAL DIGITAL BROADCASTING | AGC SIGNAL TO TUNER FOR SATELLITE DIGITAL BROADCASTING | SERIAL COMMUNI-CATIONS SIGNAL TO TUNER FOR SATELLITE DIGITAL BROADCASTING |
| 2 | "H" | "L" | AGC SIGNAL TO TUNER FOR SATELLITE DIGITAL BROADCASTING | SERIAL COMMUNI-CATIONS SIGNAL TO TUNER FOR TERRESTRIAL DIGITAL BROADCASTING | AGC SIGNAL TO TUNER FOR TERRESTRIAL DIGITAL BROADCASTING | SERIAL COMMUNI-CATIONS SIGNAL TO TUNER FOR SATELLITE DIGITAL BROADCASTING |
| 3 | "L" | "H" | AGC SIGNAL TO TUNER FOR TERRESTRIAL DIGITAL BROADCASTING | SERIAL COMMUNI-CATIONS SIGNAL TO TUNER FOR SATELLITE DIGITAL BROADCASTING | AGC SIGNAL TO TUNER FOR SATELLITE DIGITAL BROADCASTING | SERIAL COMMUNI-CATIONS SIGNAL TO TUNER FOR TERRESTRIAL DIGITAL BROADCASTING |
| 4 | "H" | "H" | AGC SIGNAL TO TUNER FOR SATELLITE DIGITAL BROADCASTING | SERIAL COMMUNI-CATIONS SIGNAL TO TUNER FOR SATELLITE DIGITAL BROADCASTING | AGC SIGNAL TO TUNER FOR TERRESTRIAL DIGITAL BROADCASTING | SERIAL COMMUNI-CATIONS SIGNAL TO TUNER FOR TERRESTRIAL DIGITAL BROADCASTING |

FIG.15

| NO. 141 | SWITCHING SIGNAL A 92 | SWITCHING SIGNAL B 93 | TERMINAL A 86 | TERMINAL B 87 | TERMINAL C 88 | TERMINAL D 89 |
|---|---|---|---|---|---|---|
| 1 | "0" | "0" | AGC SIGNAL TO TUNER FOR TERRESTRIAL DIGITAL BROADCASTING | SERIAL COMMUNI-CATIONS SIGNAL TO TUNER FOR TERRESTRIAL DIGITAL BROADCASTING | AGC SIGNAL TO TUNER FOR SATELLITE DIGITAL BROADCASTING | SERIAL COMMUNI-CATIONS SIGNAL TO TUNER FOR SATELLITE DIGITAL BROADCASTING |
| 2 | "1" | "0" | AGC SIGNAL TO TUNER FOR SATELLITE DIGITAL BROADCASTING | SERIAL COMMUNI-CATIONS SIGNAL TO TUNER FOR TERRESTRIAL DIGITAL BROADCASTING | AGC SIGNAL TO TUNER FOR TERRESTRIAL DIGITAL BROADCASTING | SERIAL COMMUNI-CATIONS SIGNAL TO TUNER FOR SATELLITE DIGITAL BROADCASTING |
| 3 | "0" | "1" | AGC SIGNAL TO TUNER FOR TERRESTRIAL DIGITAL BROADCASTING | SERIAL COMMUNI-CATIONS SIGNAL TO TUNER FOR SATELLITE DIGITAL BROADCASTING | AGC SIGNAL TO TUNER FOR SATELLITE DIGITAL BROADCASTING | SERIAL COMMUNI-CATIONS SIGNAL TO TUNER FOR TERRESTRIAL DIGITAL BROADCASTING |
| 4 | "1" | "1" | AGC SIGNAL TO TUNER FOR SATELLITE DIGITAL BROADCASTING | SERIAL COMMUNI-CATIONS SIGNAL TO TUNER FOR SATELLITE DIGITAL BROADCASTING | AGC SIGNAL TO TUNER FOR TERRESTRIAL DIGITAL BROADCASTING | SERIAL COMMUNI-CATIONS SIGNAL TO TUNER FOR TERRESTRIAL DIGITAL BROADCASTING |

RELATED ART

RELATED ART

US 8,634,026 B2

DIGITAL BROADCAST RECEIVING APPARATUS

CROSS REFERENCES TO RELATED APPLICATIONS

The present invention contains subject matter related to Japanese Patent Application JP 2007-229476 filed in the Japan Patent Office on Sep. 4, 2007, the entire contents of which being incorporated herein by reference.

BACKGROUND OF THE INVENTION

1. Field of the Invention

The present invention relates to digital broadcast receiving apparatuses and, more particularly, to a digital broadcast receiving apparatus configured to receive both satellite digital broadcasting and terrestrial digital broadcasting.

2. Description of the Related Art

Recently, the digitization of broadcasting has been speeded up, with the satellite digital broadcasting implemented from 2000 by use of the SHF band. Also, from December 2003, the terrestrial digital television broadcasting started by use of the UHF band. In addition, the experimental broadcasting of the terrestrial digital audio broadcasting has started by use of the VHF band.

In the service form of the satellite digital broadcasting, each of the programs produced by broadcasting companies A, B, and so on is transmitted to an uplink center in the form of TS (Transport Stream) of MPEG-2 (Motion Picture Experts Group-2) to be time-division multiplexed, the multiplexed program being transmitted to a transmitter station. In the transmitter station, a carrier having a predetermined frequency is modulated by the time-division multiplexed transport stream into transmission signal, which is transmitted to a BS (Broadcasting Satellite) via a transmission antenna.

In the broadcasting satellite, the frequency of the transmission signal received from the transmitter station is converted into a frequency of the broadcasting band of the satellite digital broadcasting and then resultant signal is amplified to be transmitted to the ground. The transmission signal transmitted from the transmitter station is received at a reception antenna to be supplied to a satellite digital broadcast receiving apparatus. It should be noted that, at the present time (year 2004), four channels, namely, four carrier frequencies, are used for the satellite digital broadcasting in Japan.

In a relation between the channel and frequency for use in the satellite digital broadcasting, channel 1 (BS1), channel 3, channel 13, and channel 15 in the 12-GHz band allocated to the Japanese satellite broadcasting are used for digital broadcasting.

In the satellite digital broadcasting, a broadcast signal is retransmitted by use of two or more transponders corresponding to channels arranged in a broadcasting satellite. Broadcast signals for one channel are transmitted from the satellite by use of one transponder. If there are eight satellite broadcasting channels, eight transponders are used for the satellite digital broadcasting. At the present, four of the eight channels are used for the satellite digital broadcasting and the remaining four channels are used for the satellite analog broadcasting.

The broadcast signals for one channel of the satellite digital broadcasting include two or more broadcasting services. For the types of broadcasting services included in channel 1 (BS1), the signals to be transmitted on channel 1 (BS1) are divided into two or more transport streams, each transport stream being allocated to each broadcasting company for broadcasting. Channel 1 (BS1) contains the television broadcasting, the audio broadcasting, and the data broadcasting at the same time.

The channels of the satellite digital broadcasting have frequencies different to each other, so that, in each satellite digital broadcasting apparatus, an incorporated tuner is controlled so as for the signal having the frequency of a desired channel to be received, thereby receiving the broadcast signal of the channel 1 (BS1).

As described above, the transport streams of the broadcast signals of channel 1 (BS1) includes the information of the television broadcast, the audio broadcasting, and the data broadcasting, so that all transport streams of the broadcast signals of channel 1 (BS1) are received and only the transport streams of a predetermined portion are extracted for decoding.

Consequently, any of the television broadcasting, the audio broadcasting, and the data broadcasting can be received by one type of tuner. Therefore, in the satellite digital broadcast receiving apparatus, the audio broadcasting and the data broadcasting can be received by use of a circuit configured to receive the television broadcasting.

As with this satellite digital broadcast receiving apparatus, terrestrial digital broadcast receiving apparatuses for receiving the terrestrial digital broadcasting are configured to receive any of the television broadcasting, the audio broadcasting, and data broadcasting with tuners of one type.

Referring to FIG. 16, there is shown a schematic diagram illustrating a tuner circuit and a demodulating circuit in a related-art digital broadcast receiving apparatus. The related-art digital broadcast receiving apparatus has three circuits; a terrestrial digital broadcast tuner circuit 151, a satellite digital broadcast tuner circuit 152, and a demodulating circuit 153 configured to demodulate an IF (Intermediate Frequency) signals 166 and 169 of the reception signals of these two schemes.

The IF signals 166 and 169 of the reception signals of these two schemes are analog signals, so that these signals are converted by an A/D converting circuits 160 and 162, respectively, into digital signals in the preprocessing of the demodulating circuit 153. The demodulating circuit 153 demodulates there digital signals. The demodulating circuits 153 has a terrestrial digital broadcast tuner circuit control block 154 and a satellite digital broadcast tuner circuit control block 155 configured to execute control in the circuit.

The terrestrial digital broadcast tuner circuit control block 154 and the satellite digital broadcast tuner circuit control block 155 have an AGC (Automatic Gain Control) 161 and an AGC 163, respectively. AGC signals of the AGC 161 and AGC 163 are fed back to the terrestrial digital broadcast tuner circuit 151 and the satellite digital broadcast tuner circuit 152 via a terminal 156 and a terminal 158, respectively. Control is executed such that the AGC signals are passed to an intermediate frequency amplifying circuit in the tuner circuit 151 and an intermediate frequency amplifying circuit in the tuner circuit 152 to be automatically amplified to an optimum level in these amplifying circuits. The control for optimizing the IF signal amplitude consequently widens dynamic range DR of the A/D converting circuits 160 and 162.

Serial communications signals 165 and 167, such as various setting data, are bidirectionally communicable between the terrestrial digital broadcast tuner circuit 151 and the satellite digital broadcast tuner circuit 152 and the terrestrial digital broadcast tuner circuit control block 154 and the satellite digital broadcast tuner control block 155 via the terminals 157 and 158, respectively.

A digital demodulating circuit configured to replace terminals of a digital modulating circuit has also been proposed (refer to Japanese Patent Laid-Open No. 2003-125302, hereinafter referred to as Patent Document 1). Namely, if the reception of two broadcast programs is desired and these two broadcast programs are on different frequency channels, then baseband signals (I signal and Q signal) outputted from two lines of tuner blocks are supplied to two lines of demodulating blocks, respectively.

If two broadcast programs of which reception is desired are on one frequency channel, then a signal switching circuit operates such that the baseband signals (I signal, Q signal) are switched so as to supply the baseband signals (I signal, Q signal) outputted from one line of tuner block to two lines of demodulating blocks.

SUMMARY OF THE INVENTION

Configuring the above-mentioned digital broadcast receiving apparatus shown in FIG. 16 has the following restrictions. Namely, terminals 156, 157, 158, and 159 are arranged in the demodulating circuit 153 in a fixed manner for controlling two tuners, the terrestrial digital broadcast tuner circuit 151 and the satellite digital broadcast tuner 152.

Consequently, the above-mentioned configuration limits the freedom in the circuit arrangement of the terrestrial digital broadcast tuner circuit 151, the satellite digital broadcast tuner circuit 152, and the demodulating circuit 153. The following describes an example in which the freedom in circuit arrangement is limited with reference to FIGS. 17 and 18. In another related-art digital broadcast receiving apparatus shown in FIG. 17, the circuit arrangements of a terrestrial digital broadcast tuner circuit 171, a satellite digital broadcast tuner circuit 172, and a demodulating circuit 173 are different.

Consequently, IF signals 176 and 179 can be wired between opposite sides of the terrestrial digital broadcast tuner circuit 171 and the demodulating circuit 173 and the opposite sides of the satellite digital broadcast tuner circuit 172 and the demodulating circuit 173. Serial communications signals 174 and 177 and AGC signals 175 and 178 can only be wired between the non-opposite sides of the terrestrial digital broadcast tuner circuit 171 and the demodulating circuit 173 and the non-opposite sides of the satellite digital broadcast tuner circuit 172 and the demodulating circuit 173; however, the signal lines do not cross each other and the length of wiring is minimized.

On the other hand, in still another digital broadcast receiving apparatus shown in FIG. 18, the circuit arrangements of a terrestrial digital broadcast tuner circuit 181, a satellite digital broadcast tuner circuit 182, and a demodulating circuit 183 are different. Because the positions of the circuit terminals of the terrestrial digital broadcast tuner circuit 181, the satellite digital broadcast tuner circuit 182, and the demodulating circuit 183 are fixed, the arrangements of these circuits are substantially the same as in FIG. 17.

Because the terminals are fixed in position, the wiring of serial communications signals 184 and 187 and AGC signals 185 and 188 is unnecessarily long. Because the serial communications signals 184 and 187 and AGC signals 185 and 188 are digital signal, it is not good for these signals to cross analog signal lines of IF signals 186 and 189. Otherwise, digital signal lines of serial communications signals 184 and 187 and AGC signals 185 and 188 may interfere the analog signal lines of IF signals 186 and 189. Therefore, in order to prevent this crossing with the IF signals, the wiring is unnecessarily long.

Further, in order to prevent the crossing with the IF signal, there are crossings between the serial communications signal and AGC signal for the terrestrial digital broadcast tuner circuit and the serial communications signal and AGC signal for the satellite digital broadcast tuner circuit. Like the crossing with the IF signal, the crossing between digital signal lines may cause signal interference, so that the wiring of this kind is undesirable.

Thus, a poor arrangement between the terrestrial digital broadcast tuner circuit 181, the satellite digital broadcast tuner circuit 182, and the demodulating circuit 183 makes it difficult to wire the signal lines for tuner control. This is because the terminals for controlling the two tuners in the demodulating circuit are arranged in a fixed manner.

In addition, as with the technique disclosed in Patent Document above, the above-mentioned configuration presents following problems. Namely, the technique disclosed in Patent Document 1 above is intended for a signal switching circuit to switch the baseband signals (I signal, Q signal) to be supplied from the tuner to the demodulating circuit.

However, the disclosed technique may not switch the control signal that is fed back from the demodulating circuit shown in FIGS. 17 and 18 to the tuner. Therefore, as with the configuration described before, the wiring of the control signal line becomes unnecessarily long. The disclosed technique makes it possible for the control signal digital line to interfere the analog signal line of the baseband signal (I signal, Q signal).

In the case of the technique disclosed in Patent Document 1 above, the two tuners are of the same receiving scheme (for satellite digital broadcasting). However, this configuration may not be applied to a configuration in which different receiving schemes are used, namely, the two tuners are for the terrestrial digital broadcast receiving and the satellite digital broadcast receiving, respectively.

Also, in the case of the technique disclosed in Patent Document 1 above, if the baseband signals (I signal, Q signal) that are supplied from the tuner to the demodulating circuit are switched by the signal switching circuit, the freedom in the arrangement of the terrestrial digital broadcast tuner circuit 151, the satellite digital broadcast tuner circuit 152, and the demodulating circuit 153 shown in FIG. 16 is also restricted.

Therefore, the present invention addresses the above-identified and other problems associated with related-art methods and apparatuses and solves the addressed problems by providing a digital broadcast receiving apparatus configured to increase the freedom in the arrangement of three circuits, a terrestrial digital broadcast tuner circuit, a satellite digital broadcast tuner circuit, and a demodulating circuit and, at the same time, minimize the interference by a control signal on a reception signal.

In carrying out the invention and according to one embodiment thereof, there is provided a digital broadcast receiving apparatus configured to receive terrestrial digital television broadcasting and satellite digital broadcasting. This digital broadcast receiving apparatus has a terrestrial digital tuner configured to receive terrestrial digital television broadcasting; a satellite digital tuner configured to receive satellite digital broadcasting; a demodulating block configured to demodulate a reception signal of the terrestrial digital television broadcasting with an output supplied from the terrestrial digital tuner, and, at the same time, demodulate a reception signal of the satellite digital broadcasting with an output supplied from the satellite digital tuner.

The above-mentioned digital broadcast receiving apparatus also has a terrestrial digital tuner control block, included in the demodulating block, configured to control the terrestrial digital tuner; a satellite digital tuner control block, included in the demodulating block, configured to control the satellite digital tuner; and a switching block configured to switch, inside the demodulating block, output terminals of the demodulating block from which a control signal supplied from the terrestrial digital tuner control block to the terrestrial digital tuner and a control signal supplied from the satellite digital tuner control block to the satellite digital tuner are outputted in accordance with a positional arrangement of the terrestrial digital tuner and the satellite digital tuner relative to the demodulating block.

In the above-mentioned digital broadcast receiving apparatus, output terminals of the demodulating block for control signals for controlling the two tuners, namely, the terrestrial digital tuner and the satellite digital tuner, can be switched by the switching block inside the demodulating block.

Consequently, in configuring a system having three circuits, namely, a terrestrial digital broadcast tuner circuit, a satellite digital broadcast tuner circuit, and a demodulating circuit, the output terminals of the demodulating block for the control signals for controlling these two tuners inside the demodulating circuit can be switched.

The above-mentioned novel configuration allows the wiring without waste of the control signal in accordance with a positional arrangement of the terrestrial digital tuner and the satellite digital tuner relative to the modulating block and, at the same time, the minimization of interference by the control signal against a reception signal due to crossing between the wiring of reception signal and the wiring of control signal. Consequently, the above-mentioned novel configuration significantly enhances the freedom in the arrangement of these three circuits and enables the wiring of a control signal line for tuner control regardless of the arrangement of the three circuits.

As described and according to the invention, a terrestrial digital broadcast tuner circuit, a satellite digital broadcast tuner circuit, and a demodulating circuit capable of the reception signals of these two schemes can be arranged with significantly higher freedom. Consequently, the novel configuration significantly enhances the selectivity in wiring, thereby contributing to the reduced size and cost of an entire system.

BRIEF DESCRIPTION OF THE DRAWINGS

FIG. 13 is a diagram illustrating a relation between output terminals and control signals switched by a switching signal supplied from a host CPU;

FIG. 14 is a diagram illustrating a relation between output terminals and control signals switched by terminal states set by a switching signal;

FIG. 15 is a diagram illustrating a relation between output terminals and control signals switched by a switching signal supplied from an $I^2$ I/F block by setting by the host CPU;

DETAILED DESCRIPTION OF THE PREFERRED EMBODIMENTS

This invention will be described in further detail by way of embodiments thereof with reference to the accompanying drawings. To be more specific, the following describes embodiments of the invention with reference to FIGS. 1 through 15. Now, referring to FIG. 1, there is shown a block diagram of a digital broadcast receiving apparatus practiced as one embodiment of the invention.

Figure 1:
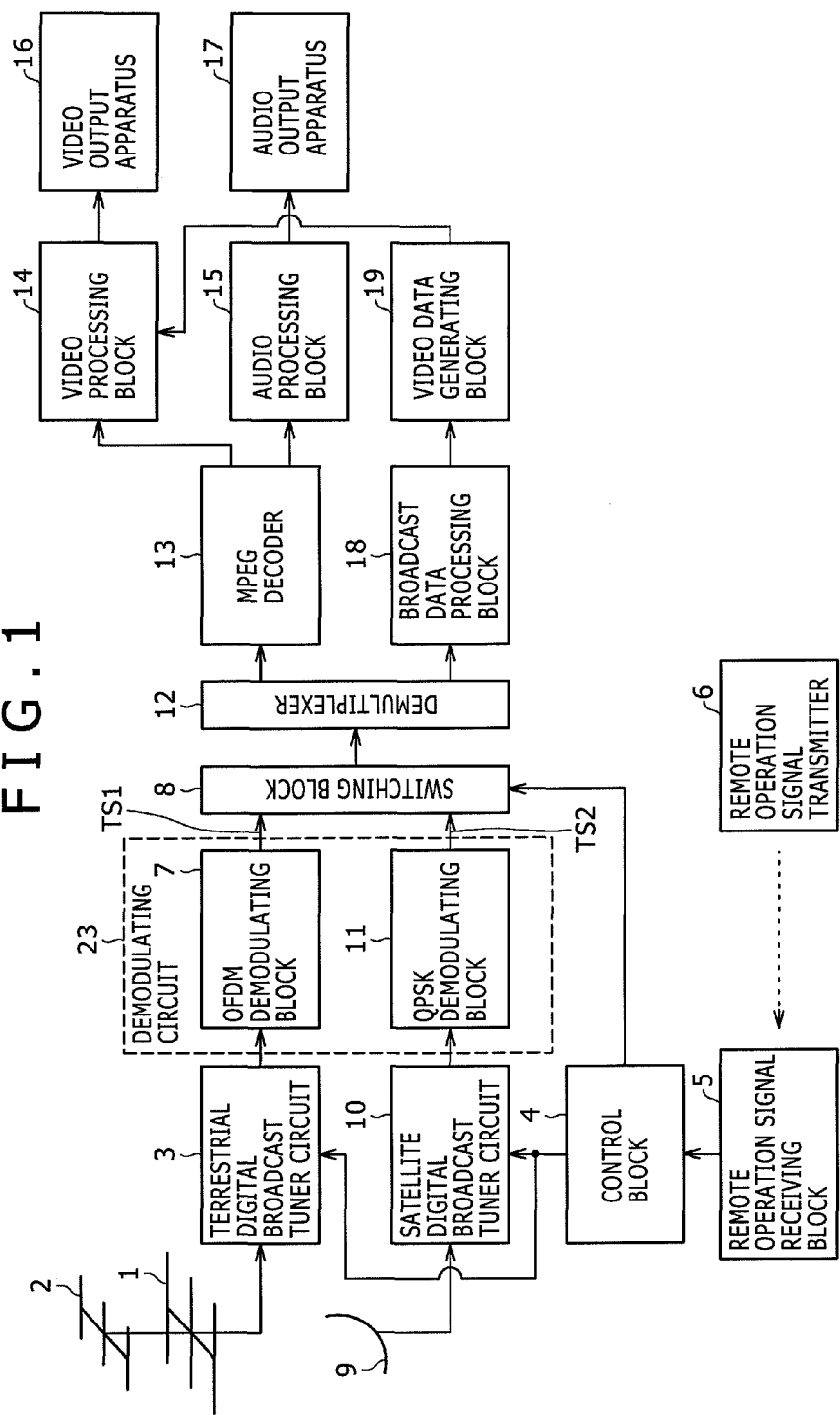
FIG. 1 is a block diagram illustrating a digital broadcast receiving apparatus practiced as one embodiment of the invention.

It should be note that, although a receiving apparatus shown in FIG. 1 can also receive analog broadcasting, this apparatus is herein referred to as a digital broadcast receiving apparatus because the function thereof is for mainly receiving digital broadcasting. For the brevity, the description of a receiving system of satellite digital broadcasting by a communications satellite (CS) is skipped herein.

Terrestrial analog television broadcast signals transmitted on VHF band (90 MHz to 220 MHz) and UHF band (440 MHz to 770 MHz) are received at a VHF antenna 1 and a UHF antenna 2 to be supplied to a terrestrial digital broadcast tuner circuit 3. A terrestrial digital television broadcast signal transmitted on UHF band is received at the UHF antenna 2 to be supplied to the terrestrial digital broadcast tuner circuit 3. A terrestrial digital audio broadcast signal transmitted on channel 7 of VHF is received at the VHF antenna 1 to be supplied to the terrestrial digital broadcast tuner circuit 3.

Figure 2:
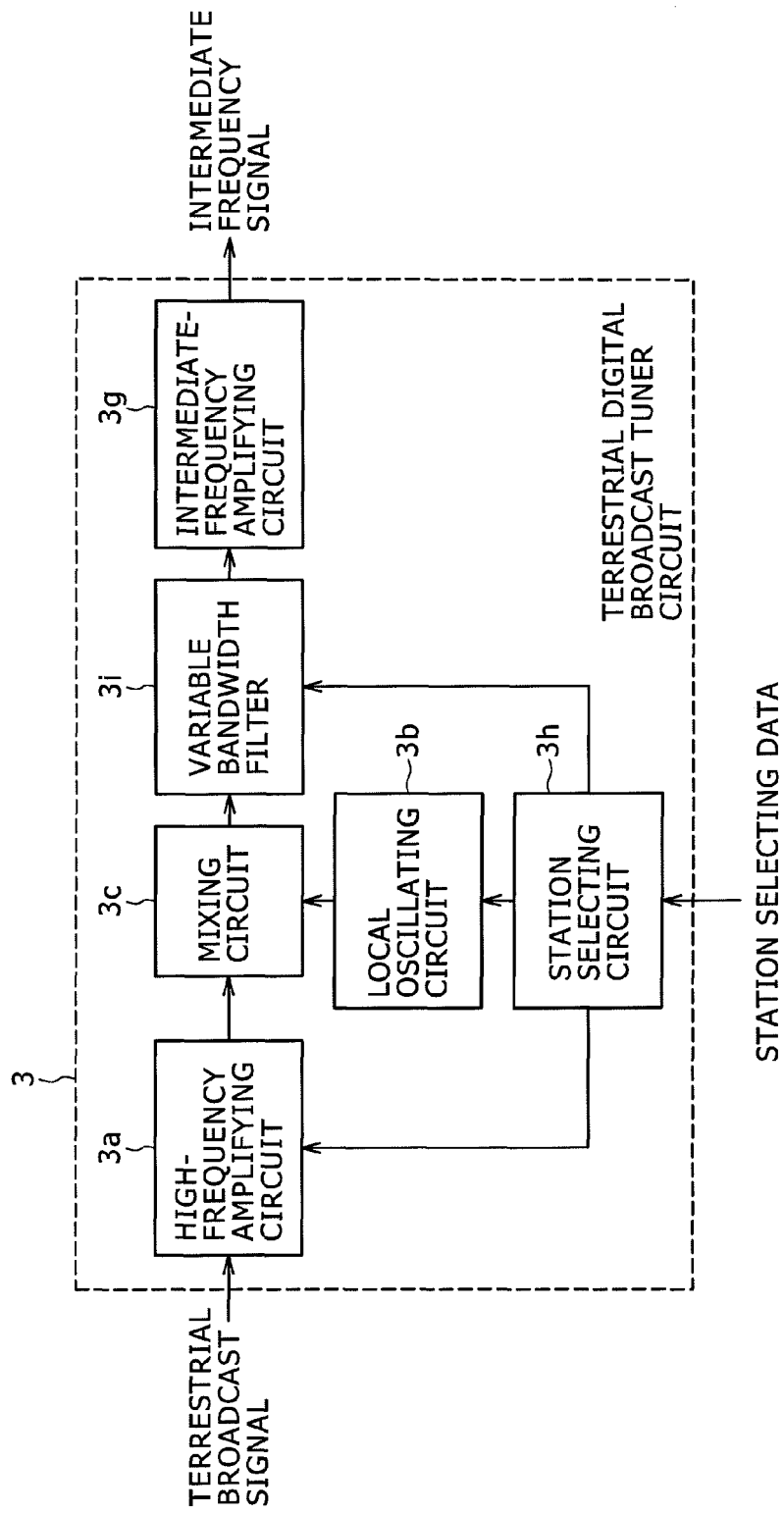
FIG. 2 a block diagram illustrating an exemplary internal configuration of a terrestrial digital tuner.

Referring to FIG. 2, there is shown a block diagram illustrating an exemplary internal configuration of the terrestrial digital broadcast tuner circuit 3. The terrestrial digital broadcast tuner circuit 3 has a high-frequency amplifying circuit 3a configured to amplify signals supplied from the VHF antenna 1 and the UHF antenna 2, a local oscillating circuit 3b configured to generate a local oscillation signal, and a mixing circuit 3c configured to mix an output signal of the high-frequency amplifying circuit 3a with a local oscillation signal from the local oscillating circuit 3b to output an intermediate-frequency signal.

The terrestrial digital broadcast tuner circuit 3 also has a variable bandwidth filter 3i configured to vary the passband width between 4 MHz and 6 MHz by an external control signal, an intermediate-frequency amplifying circuit 3g to which an output signal of the variable bandwidth filter 3i, and a station selecting circuit 3h configured to control operations of the above-mentioned high-frequency amplifying circuit 3a, the above-mentioned local oscillating circuit 3b, and a switching block, not shown.

In the terrestrial digital broadcast tuner circuit 3, a desired channel, namely a signal having a desired frequency in the entered VHF band (90 MHz to 220 MHz) and UHF band (440 MHz to 770 MHz) is converted into an intermediate-frequency signal having a predetermined frequency, 57 MHz for example. Namely, the terrestrial digital broadcast tuner circuit 3 basically has the capabilities of the VHF/UHF tuner for use in related-art terrestrial analog television broadcast receiving.

At the reception of the terrestrial digital television broadcasting transmitted in the VHF band (90 MHz to 220 MHz) and the UHF band (440 MHz to 770 MHz), an intermediate-frequency signal from the terrestrial digital broadcast tuner circuit 3 is supplied to an OFDM demodulating block 7, in which an OFDM signal is demodulated, thereby providing transport stream TS1 of MPEG. This transport stream TS1 is supplied to one input of a switching block 8 configured for transport stream.

A satellite digital television broadcast signal transmitted on the SHF band (12 GHZ) is received at an SHF antenna 9 and converted by an LNB (Low Noise Block) converter, not shown, into an intermediate-frequency signal of 1-GHz band to be supplied to a satellite digital broadcast tuner circuit 10.

In the satellite digital broadcast tuner circuit 10 a signal having a desired channel or frequency among the intermediate-frequency signals in the entered 1-GHz band is converted by direction conversion into an I signal and a Q signal, which are supplied to a QPSK demodulating block 11, in which the QPSK signal is demodulated, thereby providing MPEG transport stream TS2. This transport stream TS2 is supplied to the other input of the switching block 8.

A transport stream output of the switching block 8 configured for transport stream is supplied to a demultiplexer 12, in which video data, audio data, and broadcast data that are multiplexed with the transport stream in a time division manner are separated from the transport stream.

The video data and the audio data separated by the demultiplexer 12 are supplied to an MPEG decoder 13 to be decoded, thereby providing a video signal and an audio signal. The video signal from the MPEG decoder 13 is supplied to a video processing block 14 and the audio signal is supplied to an audio processing block 15.

Predetermined image processing is executed on the video signal supplied to the video processing block 14 and the resultant video signal is supplied to a video output apparatus 16, such as a CRT (Cathode Ray Tube), an LCD (Liquid Crystal Display), or a PDP (Plasma Display Panel). Predetermined audio processing is executed on the audio signal supplied to an audio processing block 15 and the resultant audio signal is supplied to an audio output apparatus 17, such as a loudspeaker.

The broadcast data for data broadcasting separated by the demultiplexer 12 is supplied to a broadcast data processing block 18, in which user-specified predetermined processing, EPG display processing for example, is executed on the broadcast data. A control signal from the broadcast data processing block 18 is supplied to a video data generating block 19, in which an image signal for displaying a predetermined image on the video output apparatus 16 is generated. The image signal from the video data generating block 19 is combined with the video signal of a broadcast signal in the video processing block 14.

The entire digital broadcast receiving apparatus mentioned above is controlled by a control block 4 that is implemented by a microprocessor and so on. The embodiment shown in FIG. 1 is configured to control operations of the terrestrial digital broadcast tuner circuit 3, the satellite digital broadcast tuner circuit 10, and the switching block 8 by the control block 4. Other circuit components, not shown, are also controlled by the control block 4.

The control block 4 is connected with a remote operation signal receiving block 5. A remote control signal from a remote operation signal transmitter 6 is received by the remote operation signal receiving block 5, which discriminates the contents of the received remote control signal. Accordingly, the control block 4 executes a user-specified control operation.

From the control block 4, station selection data is supplied to the terrestrial digital broadcast tuner circuit 3 and the satellite digital broadcast tuner circuit 10 for tuner switching and channel switching. Here, the above-mentioned OFDM demodulating block 7, QPSK demodulating block 11, switching block 8, demultiplexer 12, MPEG decoder 13, and broadcast data processing block 18 provide a demodulating circuit 23 configured to demodulate an intermediate-frequency signal received by the terrestrial digital broadcast tuner circuit 3 or the satellite digital broadcast tuner circuit 10.

The following describes operations to be executed by the above-mentioned digital broadcast receiving apparatus. First, an operation to be executed when the digital broadcast receiving apparatus receives a terrestrial digital television broadcast signal is described. For example, if a terrestrial digital television broadcast signal transmitted on channel 27 of UHF is received, the user turns on a terrestrial digital broadcasting button of the remote operation signal transmitter 6 and then presses a button corresponding to channel 27 of UHF among channel selection buttons.

From the remote operation signal transmitter 6, remote control signals corresponding to the types of pressed buttons are sequentially transmitted to be received by the remote operation signal receiving block 5 shown in FIG. 1, in which these signals are converted into control data corresponding to the types of pressed button to be supplied to the control block 4.

The control block 4 discriminates the contents of the control data supplied from the remote operation signal receiving block 5. If the supplied control data is found to be corresponding to the terrestrial digital broadcasting button, then the control block 4 supplies station selection data that enables the terrestrial digital broadcast tuner circuit 3 to the terrestrial digital broadcast tuner circuit 3 and the satellite digital broadcast tuner circuit 10, thereby enabling only the terrestrial digital broadcast tuner circuit 3. At the same time, the switching block 8 is switched to the side of the OFDM demodulating block 7 by a signal route switching signal supplied from the control block 4.

If the control data is found to be corresponding to the button corresponding to channel 27, then station selection data for specifying the reception of channel 27 is supplied from the control block 4 to the terrestrial digital broadcast tuner circuit 3 and the satellite digital broadcast tuner circuit 10, upon which channel 27 is received by the terrestrial digital broadcast tuner circuit 3.

The following further details the operation of the terrestrial digital broadcast tuner circuit 3. As shown in FIG. 2, when station selection data for specifying the reception of channel 27 is supplied from the control block 4 to the terrestrial digital broadcast tuner circuit 3, this station selection data is supplied to the station selecting circuit 3h. Then, the station selecting circuit 3h supplies a control voltage for setting a resonance frequency suitable for the reception of channel 27 to the high-frequency amplifying circuit 3a and the local oscillating circuit 3b. Therefore, from the mixing circuit 3c, an intermediate-frequency signal corresponding to the broadcast contents of channel 27 is outputted.

In an initial status, the frequency components of all bands of terrestrial digital television broadcast signals pass the variable bandwidth filter 3i without degradation because this filter has a passband width of 6 MHz.

The signal that has passed the variable bandwidth filter 3i is amplified by the intermediate-frequency amplifying circuit 3g to a desired level to be supplied to the OFDM demodulating block 7 shown in FIG. 1. In the OFDM demodulating block 7, MPEG transport stream TS1 is obtained by OFDM demodulation and supplied to the switching block 8.

At this moment, the switching block 8 has been switched to the side of the OFDM demodulating block 7, so that transport stream TS1 supplied from the OFDM demodulating block 7 is supplied to the demultiplexer 12 via the switching block 8 to be separated into a video part, an audio part, and a data part for extraction. The video part and the audio part are supplied to the MPEG decoder 13 to be decoded into a video signal and an audio signal that are supplied to the video processing block 14 and the audio processing block 15, respectively.

The video signal supplied to the video processing block 14 is image-processed in a predetermined manner to be supplied to the video output apparatus 16. The audio signal supplied to the audio processing block 15 is audio-processed in a predetermined manner to be supplied to the audio output apparatus 17. Consequently, the user can view the terrestrial digital television broadcast program being transmitted on channel 27.

The data part obtained in the demultiplexer 12 is supplied to the broadcast data processing block 18 to generate a control signal corresponding to the contents of the broadcast data. This control signal is supplied to the video data generating block 19 to generate an image signal corresponding to the contents of the broadcast data. This image data is supplied to the video processing block 14 to be combined with the video signal of the broadcast program. Therefore, the user can view the contents of the data broadcast.

The following describes an operation of receiving a terrestrial audio broadcast signal. For example, if a terrestrial digital audio broadcast signal being transmitted on channel 7 of VHF is received, the user turns on the terrestrial digital broadcasting button of the remote operation signal transmitter 6 and then presses a service mode button once.

Remote control signals corresponding to the types of pressed buttons are sequentially transmitted from the remote operation signal transmitter 6 to be received by the remote operation signal receiving block 5 shown in FIG. 1. The received remote control signals are converted into the control data corresponding to the types of pressed buttons to be supplied to the control block 4.

The control block 4 discriminates the contents of the control data supplied from the remote operation signal receiving block 5. If the control data is found to be corresponding to the terrestrial digital broadcasting button, then the control block 4 supplies station selection data for enabling the terrestrial digital broadcast tuner circuit 3 to the terrestrial digital broadcast tuner circuit 3 and the satellite digital broadcast tuner circuit 10, thereby enabling only the terrestrial digital broadcast tuner circuit 3. At the same time, the switching block 8 is switched to the side of the OFDM demodulating block 7 by a signal route switching signal supplied from the control block 4.

If the control data is found to be corresponding to the button corresponding to terrestrial digital audio broadcasting, then the control block 4 supplies the station selection data for specifying the reception of channel 7 to the terrestrial digital broadcast tuner circuit 3 and the satellite digital broadcast tuner circuit 10, upon which channel 7 is received by the terrestrial digital broadcast tuner circuit 3.

The following further details the operation of the terrestrial digital broadcast tuner circuit 3. As shown in FIG. 2, when station selection data for specifying the reception of channel 7 is supplied from the control block 4 to the terrestrial digital broadcast tuner circuit 3, this station selection data is supplied to the station selecting circuit 3h. Then, the station selecting circuit 3h supplies a control voltage for setting a resonance frequency suitable for the reception of channel 7 to the high-frequency amplifying circuit 3a and the local oscillating circuit 3b. Therefore, from the mixing circuit 3c, an intermediate-frequency signal corresponding to the broadcast contents of channel 7 is outputted.

The station selection data is supplied from the control block 4 to the terrestrial digital broadcast tuner circuit 3. Consequently, the intermediate-frequency signal from the mixing circuit 3c is supplied to the variable bandwidth filter 3i. The frequency components of all bands of terrestrial digital television broadcast signals pass the variable bandwidth filter 3i without degradation and there is no interference by broadcast signals of adjacent channels because this filter has a passband width of 4 MHz.

The signal that has passed the variable bandwidth filter 3i is amplified by the intermediate-frequency amplifying circuit 3g to a desired level to be supplied to the OFDM demodulating block 7 shown in FIG. 1. In the OFDM demodulating block 7, MPEG transport stream TS1 is obtained by OFDM demodulation and supplied to the switching block 8.

At this moment, the switching block 8 has been switched to the side of the OFDM demodulating block 7, so that transport stream TS1 supplied from the OFDM demodulating block 7 is supplied to the demultiplexer 12 via the switching block 8, in which the audio part is separated for extraction. The audio part is supplied to the MPEG decoder 13 to be decoded into an audio signal. The audio signal is supplied to the audio processing block 15 to be audio-processed. The processed audio signal is supplied to the audio output apparatus 17. Consequently, the user can view the terrestrial digital audio broadcast program being broadcast on channel 7.

The following describes an operation of receiving a satellite television broadcast signal. For example, if a BS digital television broadcast signal of service ID 151CH being transmitted on channel 1 (BS1) of SHF is received, the user turns on the BS digital broadcasting button of the remote operation signal transmitter 6.

Next, the user presses a channel selection button 5, namely, a button corresponding to service ID 151CH. From the remote operation signal transmitter 6, remote control signals corresponding to the types pressed buttons are sequentially transmitted. These remote control signals are received by the remote operation signal receiving block 5 shown in FIG. 1 to be converted into the control data corresponding to pressed buttons. The control data is then supplied to the control block 4.

The control block 4 discriminates the contents of the control data supplied from the remote operation signal receiving block 5. If the control data is found to be corresponding to the BS digital broadcasting button, then station selection data for enabling the satellite digital broadcast tuner circuit 10 is supplied to the terrestrial digital broadcast tuner circuit 3 and the satellite digital broadcast tuner circuit 10 to enable only the satellite digital broadcast tuner circuit 10. At the same time, the switching block 8 is switched to the side of the QPSK demodulating block 11 by a signal route switching signal from the control block 4.

If the control data is found to be corresponding to channel 1 of SHF, then station selection data for specifying the reception of channel 1 of SHF is supplied from the control block 4 to the terrestrial digital broadcast tuner circuit 3 and satellite digital broadcast tuner circuit 10 to receive channel 1 of SHF by the satellite digital broadcast tuner circuit 10. An output of the satellite digital broadcast tuner circuit 10 is supplied to the QPSK demodulating block 11 shown in FIG. 1. In the QPSK demodulating block 11, MPEG transport stream TS2 is obtained by QPSK demodulation to be supplied to the switching block 8.

At this moment, the switching block 8 has been switched to the side of the QPSK demodulating block 11, so that transport stream TS2 from the QPSK demodulating block 11 is supplied to the demultiplexer 12 via the switching block 8, in which transport stream TS2 is separated into a video part, an audio part, and a data part for extraction. The video part and the audio part are supplied to the MPEG decoder 13 to be decoded into a video signal and an audio signal, which are supplied to the video processing block 14 and the video audio processing block 15, respectively.

The video signal supplied to the video processing block 14 is image-processed to be supplied to the video output apparatus 16. The audio signal supplied to the video output apparatus 15 is audio-processed to be supplied to the audio output apparatus 17. Consequently, the user can view the BS digital television broadcast program of service ID 151CH being broadcast on channel 1 (BS1) of SHF.

Figure 3:
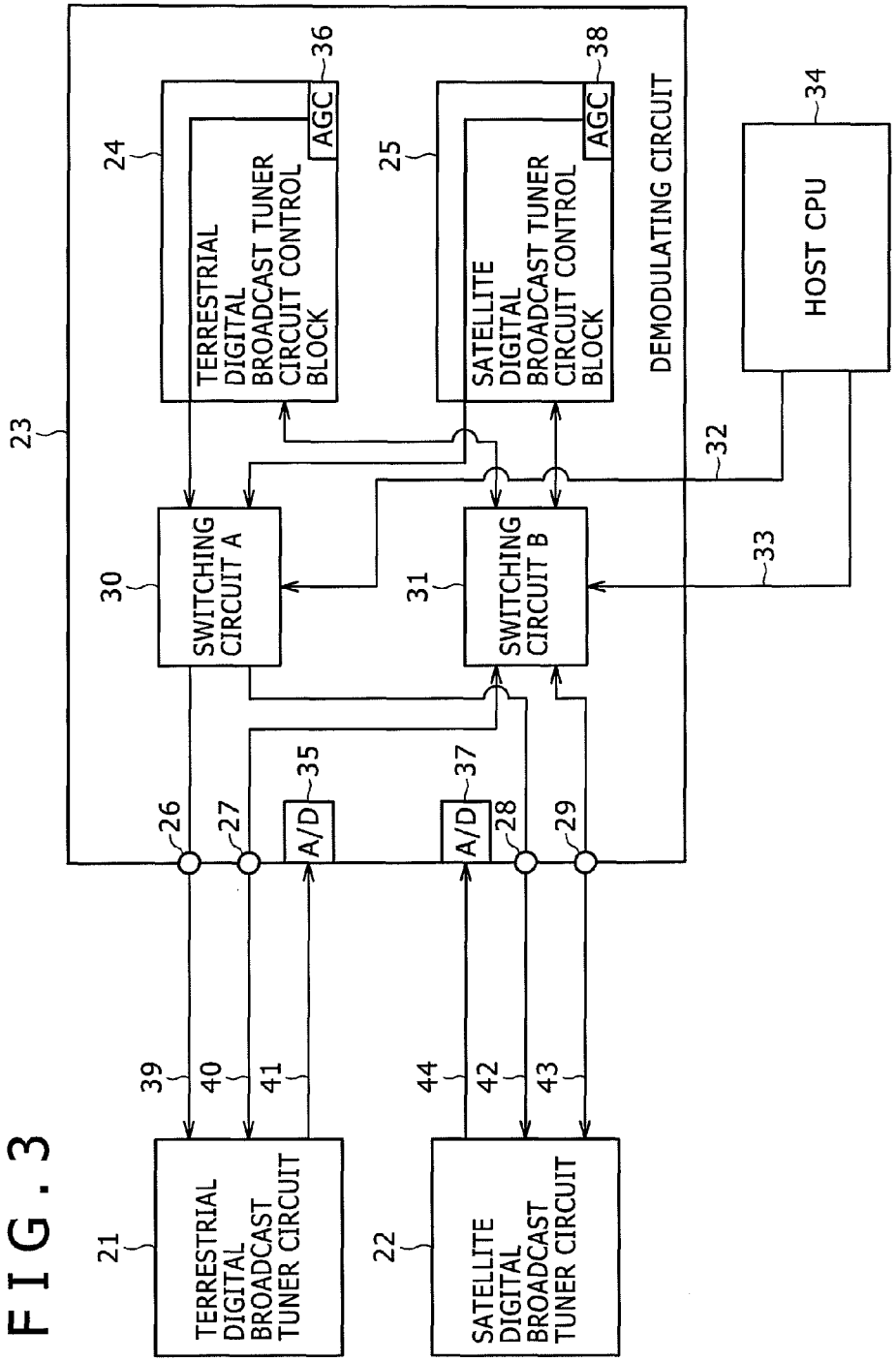
FIG. 3 is a schematic diagram illustrating a tuner circuit and a demodulating circuit in the digital broadcast receiving apparatus shown in FIG. 1.

Referring to FIG. 3, there is shown a schematic diagram illustrating a tuner circuit and a demodulating circuit of the digital broadcast receiving apparatus of the present embodiment. This digital broadcast receiving apparatus has a terrestrial digital broadcast tuner circuit 21, a satellite digital broadcast tuner circuit 22, and a demodulating circuit 23 configured to demodulate IF (Intermediate Frequency) signals 41 and 44, reception signals of these two schemes.

These two reception signals IF 41 and 44 are both analog signals, so that these signals are converted into digital signals by an A/D converting circuits 35 and 37 in the preprocessing of the demodulating circuit 23. The demodulating circuit 23 demodulates these digital signals. The demodulating circuit 23 has a terrestrial digital broadcast tuner circuit control block 24 and a satellite digital broadcast tuner circuit control block 25 for executing control inside the demodulating circuit 23.

The terrestrial digital broadcast tuner circuit control block 24 and the satellite digital broadcast tuner circuit control block 25 each have AGCs (Automatic Gain Controls) 36 and 38. AGC signals from the AGCs 36 and 38 are fed back to the terrestrial digital broadcast tuner circuit 21 and the satellite digital broadcast tuner circuit 22 via terminals 26 and 28, respectively. The AGC signals are passed to an intermediate-frequency amplifying circuit in the terrestrial digital broadcast tuner circuit 21 and an intermediate-frequency amplifying circuit in the satellite digital broadcast tuner circuit 22, respectively, to be automatically optimized in amplification. This IF signal amplitude optimizing control provides an effect of widening the dynamic range DR of the A/D converting circuits 35 and 37.

Serial communications signals 40 and 43, such as various setting data, control the selection or passband of the terrestrial digital broadcast tuner circuit 21 and the satellite digital broadcast tuner circuit 22 via a switching circuit B (31), a terminal B (27), and a terminal D (29).

Also, the serial communications signals 40 and 43 are bidirectionally communicable between the terrestrial digital broadcast tuner circuit 21 and the satellite digital broadcast tuner circuit 22 and the terrestrial digital broadcast tuner circuit control block 24 and the satellite digital broadcast tuner circuit control block 25.

Namely, referring to FIG. 3, the digital broadcast receiving apparatus of the present embodiment has a host CPU 34 in addition to the demodulating circuit 23 configured to be compatible with two broadcasting schemes, the terrestrial digital broadcasting and the satellite digital broadcasting, the terrestrial digital broadcast tuner circuit 21, and the satellite digital broadcast tuner circuit 22. The host CPU 34 has a function of switching between the connection states of a switching circuit A (30) and a switching circuit B (31).

The demodulating circuit 23 has the terrestrial digital broadcast tuner circuit control block 24, the satellite digital broadcast tuner circuit control block 25, the switching circuit A (30) and the switching circuit B (31). The switching circuit A (30) and the switching circuit B (31) are connected to the host CPU 34 via switching signal A (32) and switching signal B (33).

Terminal A (26) and terminal C (28) of the demodulating circuit 23 output AGC signals 39 and 42 that are fed back to the terrestrial digital broadcast tuner circuit 21 and the satellite digital broadcast tuner circuit 22, respectively.

Terminal B (27) and terminal D (29) of the demodulating circuit 23 are terminals for the serial communications signals 40 and 43 that are fed back to the terrestrial digital broadcast tuner circuit 21 and the satellite digital broadcast tuner circuit 22, respectively.

The following describes a relation between tuner circuit arrangement and terminal position. As shown in FIG. 3, the relation becomes as follows if the terrestrial digital broadcast tuner circuit 21 is arranged near terminal A (26) and terminal B (27) and the satellite digital broadcast tuner circuit 22 is arranged near terminal C (28) and terminal D (29).

Referring to FIG. 13, there is shown a relation between the control signals switched by a switching signal supplied from the host CPU and the output terminals. In this case, the switching states of switching circuit A (30) and switching circuit B (31) are set via switching signal A (32) and switching signal B (33) from the host CPU 34, such as "1" of No. 121 in FIG. 13.

Namely, if switching signal A (32) is "0" and switching signal B (33) is also "0," then terminal A (26) provides an AGC signal for the terrestrial digital broadcast tuner, terminal B (27) provides a serial communications signal for the terrestrial digital broadcast tuner, terminal C (28) provides an AGC signal for the satellite digital broadcast tuner, and terminal D (29) provides a serial communications signal for the satellite digital broadcast tuner.

Consequently, the terminal states of terminal A (26), terminal B (27), terminal C (28), and terminal D (29) can be determined, thereby facilitating the wiring of the AGC signals 39 and 42 and the serial communications signals 40 and 43 for the two tuner circuits.

Figure 4:
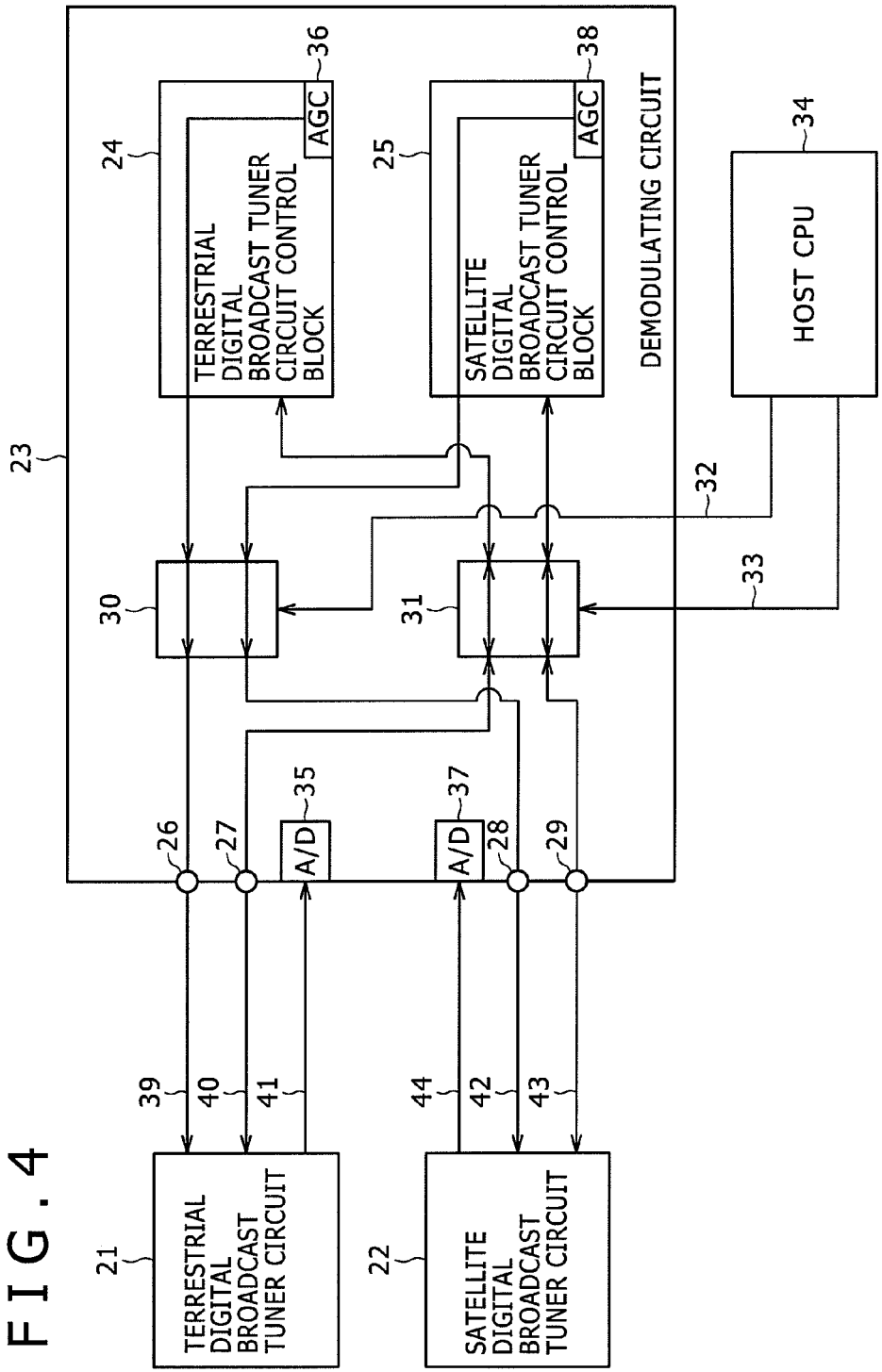
FIG. 4 is a diagram illustrating a switching state of a switching circuit of the demodulating circuit.

The connection state of switching circuit A (30) and switching circuit B (31) at that time is shown in FIG. 4. As shown in FIG. 4, in switching circuit A (30), the AGC 36 is connected to terminal A (26) and the AGC 38 is connected to terminal C (28). In switching circuit B (31), the terrestrial digital broadcast tuner circuit control block 24 is connected to terminal B (27) and the satellite digital broadcast tuner circuit control block 25 is connected to terminal D (29).

If the satellite digital broadcast tuner circuit 22 is arranged near terminal A (26) and terminal B (27) and the terrestrial digital broadcast tuner circuit 21 is arranged near terminal C (28) and terminal D (29), the following configuration is obtained. In this case, the switching state of switching terminal A (30) and switching terminal B (31) is set via switching signal A (32) and switching signal B (33) from the host CPU 34, such as "4" of No. 121 in FIG. 13.

To be more specific, if switching signal A (32) is "1" and switching signal B (33) is also "1," then terminal A (26) provides an AGC signal for the satellite digital broadcast tuner, terminal B (27) provides a serial communications signal for the satellite digital broadcast tuner, terminal C (28) provides an AGC signal for the terrestrial digital broadcast tuner, and terminal D (29) provides a serial communications signal for the terrestrial digital broadcast tuner.

Consequently, the terminal state of terminal A (26), terminal B (27), terminal C (28), and terminal D (29) can be determined, thereby facilitating the wiring of the AGC signals 39 and 42 and the serial communications signals 40 and 43 for the two tuner circuits.

Figure 5:
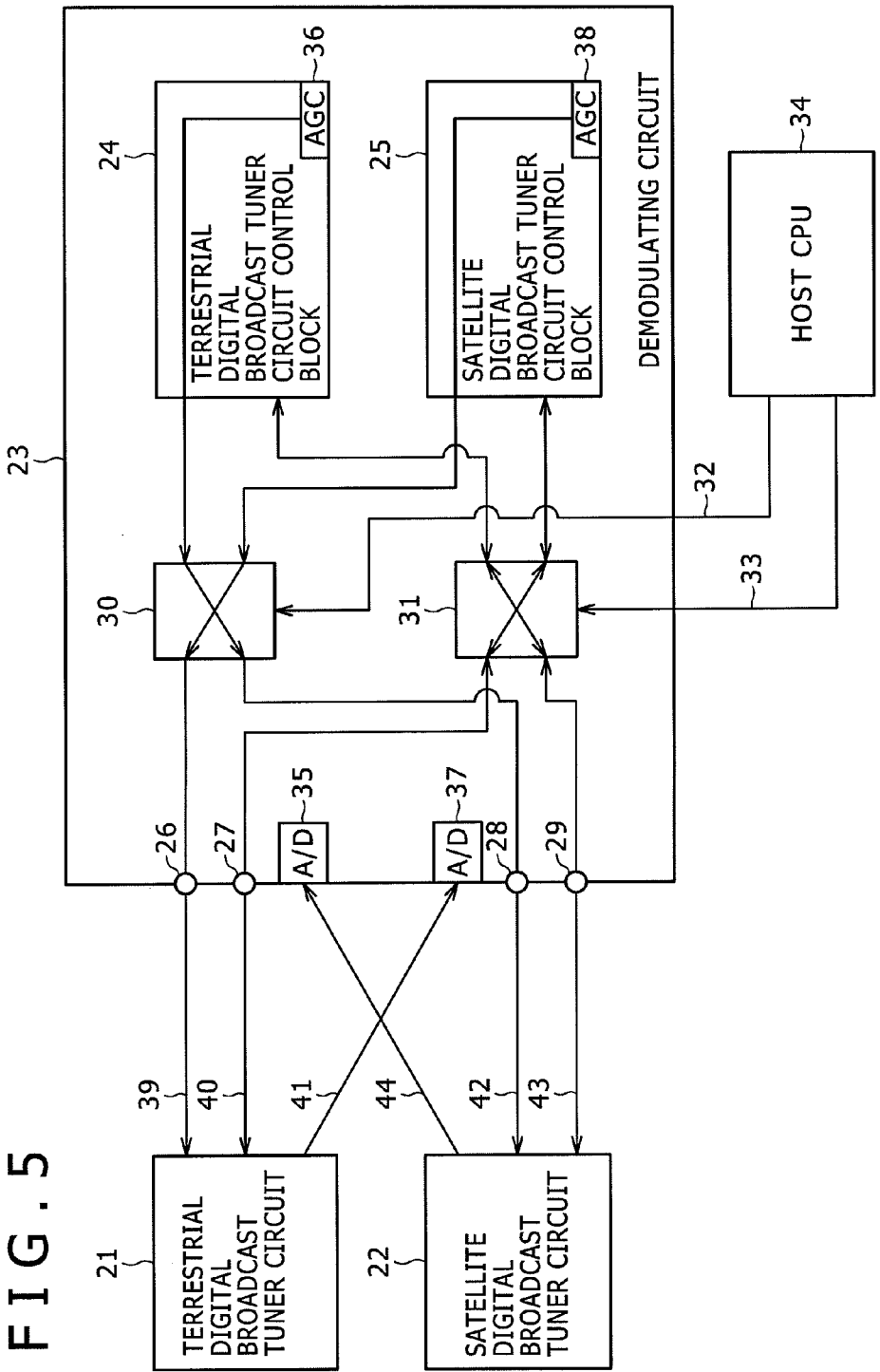
FIG. 5 is a diagram illustrating another switching state of the switching circuit of the demodulating circuit.

A switching connection state of switch circuit A (30) and switching circuit B (31) at that time is shown in FIG. 5. As shown in FIG. 5, in switching circuit A (30), the AGC 36 is connected to terminal C (28) and the AGC 38 is connected to terminal A (26). In switching circuit B (31), the terrestrial digital broadcast tuner circuit control block 24 is connected to terminal D (29) and the satellite digital broadcast tuner circuit control block 25 is connected to terminal B (27).

The following describes a case in which the satellite digital broadcast tuner circuit 22 and the terrestrial digital broadcast tuner circuit 21 are arranged in a horizontal manner. If the satellite digital broadcast tuner circuit 22 is arranged near terminal A (26) and terminal D (29) and the terrestrial digital broadcast tuner circuit 21 is arranged near terminal B (27) and terminal C (28), the following configuration is obtained.

Figure 6:
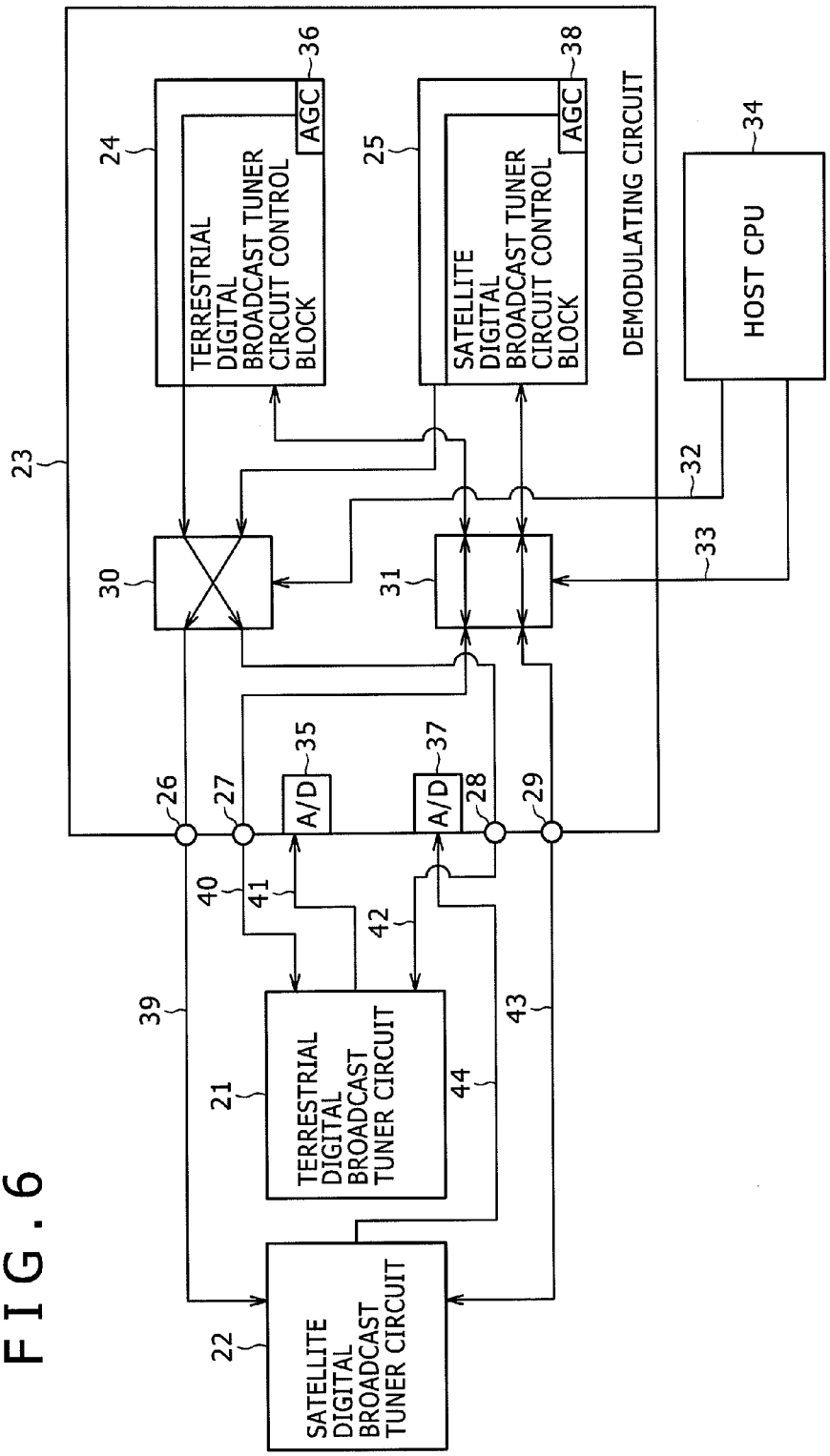
FIG. 6 is a diagram illustrating still another switching state of the switching circuit of the demodulating circuit.

The satellite digital broadcast tuner circuit 22 is arranged to the left of the terrestrial digital broadcast tuner circuit 21. The terminals of the satellite digital broadcast tuner circuit 22 are positioned at the upper and lower sides thereof and the terminals of the terrestrial digital broadcast tuner circuit 21 are positioned at the right side thereof. FIG. 6 shows the switching connection state of switching circuit A (30) and switching circuit B (31) when the satellite digital broadcast tuner circuit 22 is arranged to the left of the terrestrial digital broadcast tuner circuit 21. In this case, the switching state of switching circuit A (30) and switching circuit B (30) is set via switching signal A (32) and switching signal B (33) from the host CPU 34, as with "2" of No. 121 in FIG. 13.

To be more specific, when switching signal A (32) is "1" and switching signal B (33) is "0," terminal A (26) provides an AGC signal for the satellite digital broadcast tuner, terminal B (27) provides a serial communications signal for the terrestrial digital broadcast tuner, terminal C (28) provides an AGC signal for the terrestrial digital broadcast tuner, and terminal D (29) provides a serial communications signal for the satellite digital broadcast tuner. Consequently, the terminal state of terminal A (26), terminal B (27), terminal C (28), and terminal D (29) can be determined, thereby facilitating the wiring of the AGC signals 39 and 42 and the serial communications signals 40 and 43 for the two tuner circuits.

If the satellite digital broadcast tuner circuit 22 is arranged near terminal B (27) and terminal C (28) and the terrestrial digital broadcast tuner circuit 21 is arranged near terminal A (26) and terminal D (29), the following configuration is obtained. In this configuration, the satellite digital broadcast tuner circuit 22 is arranged to the right of the terrestrial digital broadcast tuner circuit 21. The terminals of the terrestrial digital broadcast tuner circuit 21 are positioned at the upper and lower ends thereof. The terminals of the satellite digital broadcast tuner circuit 22 are positioned at the right side thereof. In this configuration, the arrangement of the satellite digital broadcast tuner circuit 22 and the terrestrial digital broadcast tuner circuit 21 is reverse to that shown in FIG. 6.

In this case, the switching state of switching circuit A (30) and switching circuit B (31) is set via switching signal A (32) and switching signal B (33) from the host CPU 34, such as "3" of No. 121 in FIG. 13. To be more specific, when switching signal A (32) is "0" and switching signal B (33) is "1," terminal A (26) provides an AGC signal for the terrestrial digital broadcast tuner, terminal B (27) provides a serial communications signal for the satellite digital broadcast tuner, terminal C (28) provides an AGC signal for the satellite digital broadcast turner, and terminal D (29) provides a serial communications signal for the terrestrial digital broadcast tuner.

Consequently, the terminal state of terminal A (26), terminal B (27), terminal C (28), and terminal D (29) can be determined, thereby facilitating the wiring of the AGC signals 39 and 42 and the serial communications signals 40 and 43 for the two tuner circuits.

Figure 7:
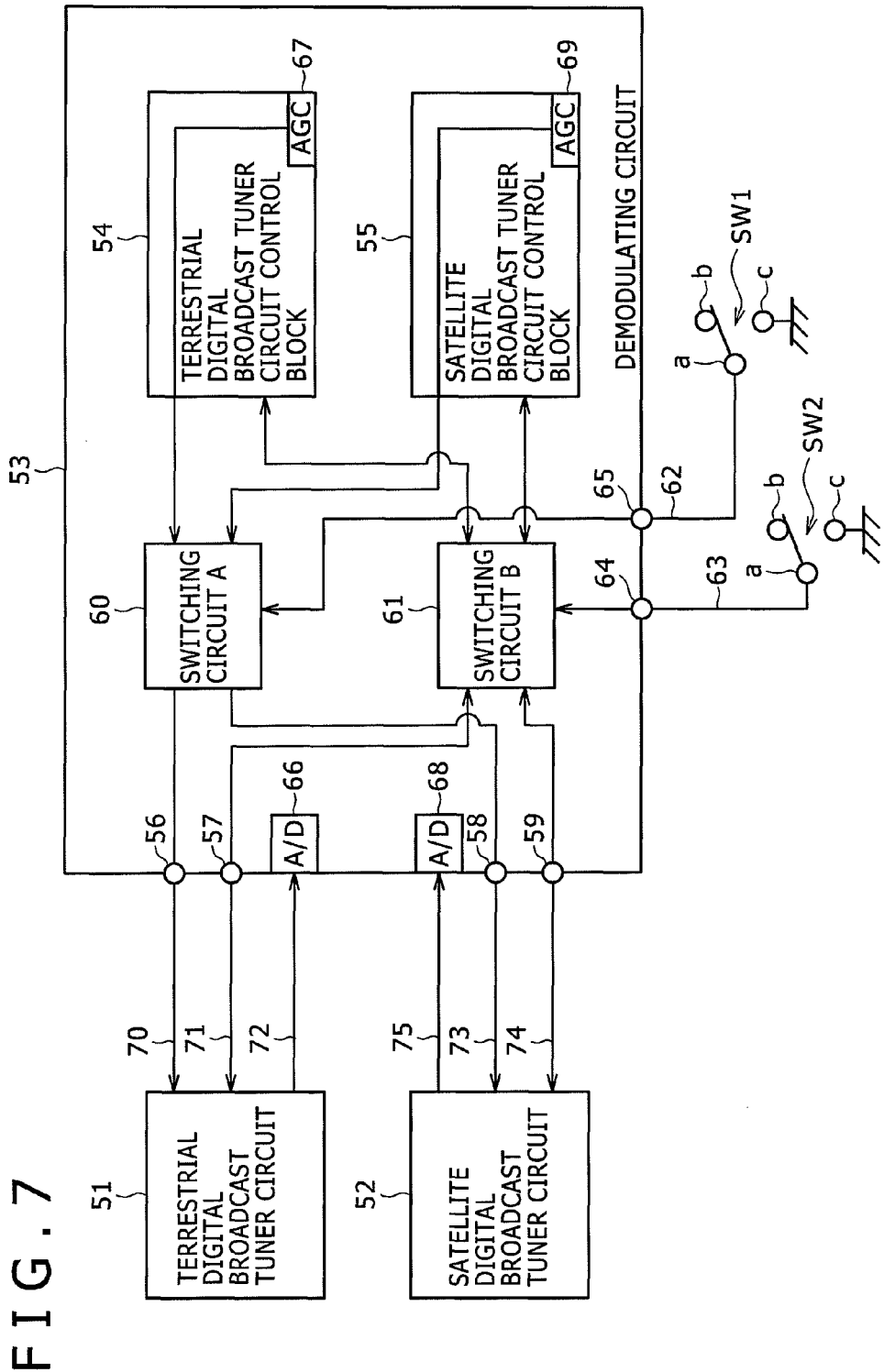
FIG. 7 is a schematic diagram illustrating a tuner circuit and a demodulating circuit of another digital broadcast receiving apparatus.

Referring to FIG. 7, there is shown a schematic diagram of a tuner circuit and a demodulating circuit of a digital broadcast receiving apparatus practiced as another embodiment of the invention. The digital broadcast receiving apparatus shown in FIG. 7 has three circuits, a terrestrial digital broadcast tuner circuit 51, a satellite digital broadcast tuner circuit 52, and a demodulating circuit 53 configured to demodulate IF signals 72 and 75 that are reception signals of these two schemes.

These two reception signals IF 72 and 75 are both analog signals, so that these signals are converted into digital signals by an A/D converting circuits 66 and 68 in the preprocessing of the demodulating circuit 53. The demodulating circuit 53 demodulates these digital signals. The demodulating circuit 53 has a terrestrial digital broadcast tuner circuit control block 54 and a satellite digital broadcast tuner circuit control block 55 for executing control inside the demodulating circuit 53.

At this time, the terrestrial digital broadcast tuner circuit control block 54 and the satellite digital broadcast tuner circuit control block 55 each have AGCs (Automatic Gain Controls) 67 and 69. AGC signals from the AGCs 67 and 69 are fed back to the terrestrial digital broadcast tuner circuit 51 and the satellite digital broadcast tuner circuit 52 via terminals 56 and 58, respectively. The AGC signals are passed to an intermediate-frequency amplifying circuit in the terrestrial digital broadcast tuner circuit 51 and an intermediate-frequency amplifying circuit in the satellite digital broadcast tuner circuit 52, respectively, to be automatically optimized in amplification. This IF signal amplitude optimizing control provides an effect of widening the dynamic range DR of the A/D converting circuits 66 and 68.

Serial communications signals 71 and 74, such as various setting data, control the selection or passband of the terrestrial digital broadcast tuner circuit 51 and the satellite digital broadcast tuner circuit 52 via a switching circuit B (61), a terminal B (57), and a terminal D (59).

Also, the serial communications signals 71 and 74 are bidirectionally communicable between the terrestrial digital broadcast tuner circuit 51 and the satellite digital broadcast tuner circuit 52 and the terrestrial digital broadcast tuner circuit control block 54 and the satellite digital broadcast tuner circuit control block 55.

Namely, referring to FIG. 7, the digital broadcast receiving apparatus shown has terminals an external circuit configured to give a predetermined voltage to these terminals in addition to the demodulating circuit 53 configured to be compatible with two broadcasting schemes, the terrestrial digital broadcasting and the satellite digital broadcasting, the terrestrial digital broadcast tuner circuit 51, and the satellite digital broadcast tuner circuit 52. These terminals and external circuit have a function of switching between the connection states of a switching circuit A (60) and a switching circuit B (61).

The demodulating circuit 53 has the terrestrial digital broadcast tuner circuit control block 54, the satellite digital broadcast tuner circuit control block 55, switching circuit A (60), and switching circuit B (61). Switching circuit (60) and switching circuit (61) are connected to an external circuit via switching signal A (62) and switching signal B (63) through terminal E (64) and terminal F (65) of the demodulating circuit 53. The external circuit herein can select logical "High" or "Low" of the potential of switching signal A (62) and switching signal B (63).

For example, by selectively connecting movable contact a, fixed contact b (+ supply), or c (ground) of switch SW1, the external circuit gives a predetermined potential to switching signal B (63).

Terminal A (56) and terminal C (58) of the demodulating circuit 53 output AGC signals 70 and 73 that are fed back to the terrestrial digital broadcast tuner circuit 51 and the satellite digital broadcast tuner circuit 52, respectively. Terminal B (57) and terminal D (59) of the demodulating circuit 53 are for serial communications signals 71 and 74 that are fed back to the terrestrial digital broadcast tuner circuit 51 and the satellite digital broadcast tuner circuit 52, respectively.

The following describes a relation between tuner circuit arrangement and terminal position. As shown in FIG. 7, the relation becomes as follows if the terrestrial digital broadcast tuner circuit 51 is arranged near terminal A (56) and terminal B (57) and the satellite digital broadcast tuner circuit 52 is arranged near terminal C (58) and terminal D (59).

Referring to FIG. 14, there is shown a relation between control signals switched by the terminal state set by the switching signal and output terminals. In this case, the switching state of switching circuit A (60) and switching circuit B (61) is set via switching signal A (62) and switching signal B (63) to terminal E (64) and terminal F (65) from the external circuit.

Namely, when switching signal A (62) is "Low" and switching signal B (63) is also "Low," terminal A (56) provides an AGC signal for terrestrial digital broadcast tuner, terminal B (57) provides a serial communications signal for terrestrial digital broadcast tuner, terminal C (58) provides an AGC signal for satellite digital broadcast tuner, and terminal D (59) provides a serial communications signal for satellite digital broadcast tuner.

Consequently, the terminal state of terminal A (56), terminal B (57), terminal C (58), and terminal D (59) can be determined, thereby facilitating the wiring of the AGC signals 70 and 73 and the serial communications signals 71 and 74 for the two tuner circuits.

Figure 8:
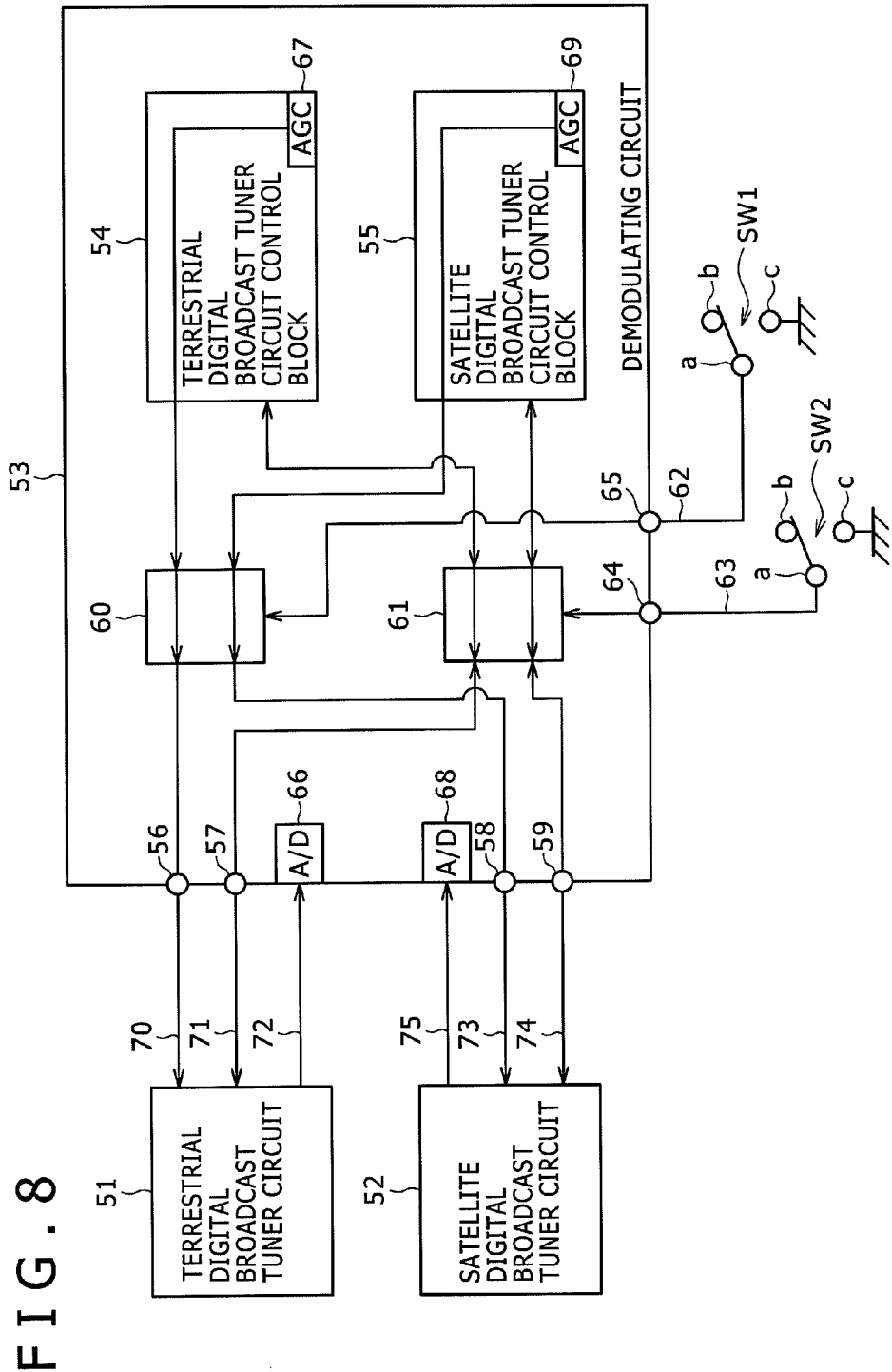
FIG. 8 is a diagram illustrating a switching state of another modulating circuit.

A connection state of switching circuit A (60) and switching circuit B (61) at that time is shown in FIG. 8. As shown in FIG. 8, in switching circuit A (60), the AGC 67 is connected to terminal A (56) and the AGC 69 is connected to terminal C (58). In switching circuit B (61), the terrestrial digital broadcast tuner circuit control block 54 is connected to terminal B (57) and the satellite digital broadcast tuner circuit control block 55 is connected to terminal D (59).

If the satellite digital broadcast tuner circuit 51 is arranged near terminal A (56) and terminal B (57) and the terrestrial digital broadcast tuner circuit 52 is arranged near terminal C (58) and terminal D (59), the following configuration is obtained. In this configuration, the switching state of switching circuit A (60) and switching circuit B (61) is set via switching signal A (62) and switching signal B (63) to terminal E (64) and terminal F (65) from the external circuit, such as "4" of No. 131 in FIG. 14.

Namely, when switching signal A (62) is "High" and switching signal B (63) is also "High," terminal A (56) provides an AGC signal for satellite digital broadcast tuner, terminal B (57) provides a serial communications signal for satellite digital broadcast tuner, terminal C (58) provides an AGC signal for terrestrial digital broadcast tuner, and terminal D (59) provides a serial communications signal for terrestrial digital broadcast tuner.

Consequently, the terminal state of terminal A (56), terminal B (57), terminal C (58), and terminal D (59) can be determined, thereby facilitating the wiring of the AGC signals 70 and 73 and the serial communications signals 71 and 74 for the two tuner circuits.

Figure 9:
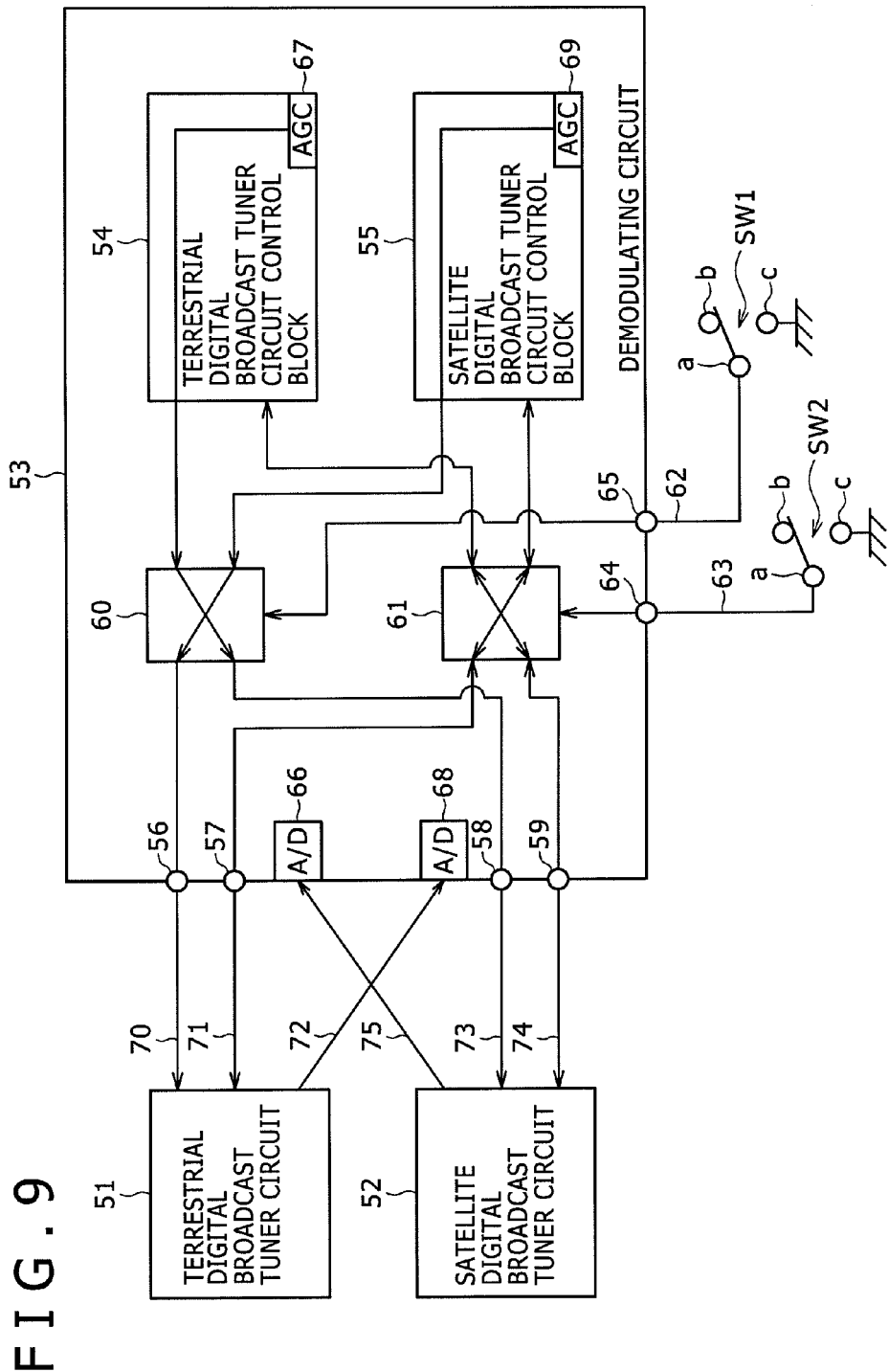
FIG. 9 is a diagram illustrating another switching state of the demodulating circuit shown in FIG. 8.

A connection state of switching circuit A (60) and switching circuit B (61) at that time is shown in FIG. 9. As shown in FIG. 9, in switching circuit A (60), the AGC 67 is connected to terminal C (58) and the AGC 69 is connected to terminal A (56). In switching circuit B (61), the terrestrial digital broadcast tuner circuit control block 54 is connected to terminal D (59) and the satellite digital broadcast tuner circuit control block 55 is connected to terminal B (57).

Consequently, by setting the switching state of switching circuit A (60) and switching circuit B (61) via switching signal A (62) and switching signal B (63) to terminal E (64) and terminal F (65) from the external circuit, the terminal state of terminal A (56), terminal B (57), terminal C (58), and terminal D (59) can be determined, thereby facilitating the wiring of the AGC signals 70 and 73 and the serial communications signals 71 and 74 for the two tuner circuits.

The following describes a configuration in which the satellite digital broadcast tuner circuit 52 and the terrestrial digital broadcast tuner circuit 51 are arranged in a horizontal manner. If the satellite digital broadcast tuner circuit 52 is arranged near terminal A (56) and terminal D (59) and the terrestrial digital broadcast tuner circuit 51 is arranged near terminal B (57) and terminal C (58), the following configuration is obtained. In this configuration the satellite digital broadcast tuner circuit 52 is arranged to the left of the terrestrial digital broadcast tuner circuit 51. Also, in this configuration, the terminals of the satellite digital broadcast tuner circuit 52 are positioned at the upper and lower sides thereof and the terminals of the terrestrial digital broadcast tuner circuit 51 are positioned at the right side thereof. This switching connection state is substantially the same as that of switching circuit A (30) and switching circuit B (31) in which satellite digital broadcast tuner circuit 22 is arranged to the left of the terrestrial digital broadcast tuner circuit 21 as shown in FIG. 6.

In this configuration, the switching state of switching circuit A (60) and switching circuit B (61) is set via switching signal A (62) and switching signal B (63) to terminal E (64) and terminal F (65) from the external circuit, such as "2" of No. 131 in FIG. 14.

Namely, when switching signal A (62) is "High" and switching signal B (63) is also "Low," terminal A (56) provides an AGC signal for satellite digital broadcast tuner, terminal B (57) provides a serial communications signal for terrestrial digital broadcast tuner, terminal C (58) provides an AGC signal for terrestrial digital broadcast tuner, and terminal D (59) provides a serial communications signal for satellite digital broadcast tuner.

Consequently, the terminal state of terminal A (56), terminal B (57), terminal C (58), and terminal D (59) can be determined, thereby facilitating the wiring of the AGC signals 70 and 73 and the serial communications signals 71 and 74 for the two tuner circuits.

If the satellite digital broadcast tuner circuit 52 is arranged near terminal B (57) and terminal C (58) and the terrestrial digital broadcast tuner circuit 51 is arranged near terminal A (56) and terminal D (59), the following configuration is obtained. In this configuration, the satellite digital broadcast tuner circuit 52 is arranged to the right of the terrestrial digital broadcast tuner circuit 51. Also, in this configuration, the terminals of the terrestrial digital broadcast tuner circuit 51 are positioned at the upper and lower sides thereof and the terminals of the satellite digital broadcast tuner circuit 52 are positioned at the right side thereof. This switching connection state is reverse to the arrangement of the satellite digital broadcast tuner circuit 22 and the terrestrial digital broadcast tuner circuit 21 shown in FIG. 6.

In this case, the switching state of switching circuit A (60) and switching circuit B (61) is set via switching signal A (62) and switching signal B (63) to terminal E (64) and terminal F (65) from the external circuit.

Namely, when switching signal A (62) is "Low" and switching signal B (63) is also "High," terminal A (56) provides an AGC signal for terrestrial digital broadcast tuner, terminal B (57) provides a serial communications signal for satellite digital broadcast tuner, terminal C (58) provides an AGC signal for satellite digital broadcast tuner, and terminal D (59) provides a serial communications signal for terrestrial digital broadcast tuner.

Consequently, the terminal state of terminal A (56), terminal B (57), terminal C (58), and terminal D (59) can be determined, thereby facilitating the wiring of the AGC signals 70 and 73 and the serial communications signals 71 and 74 for the two tuner circuits.

Figure 10:
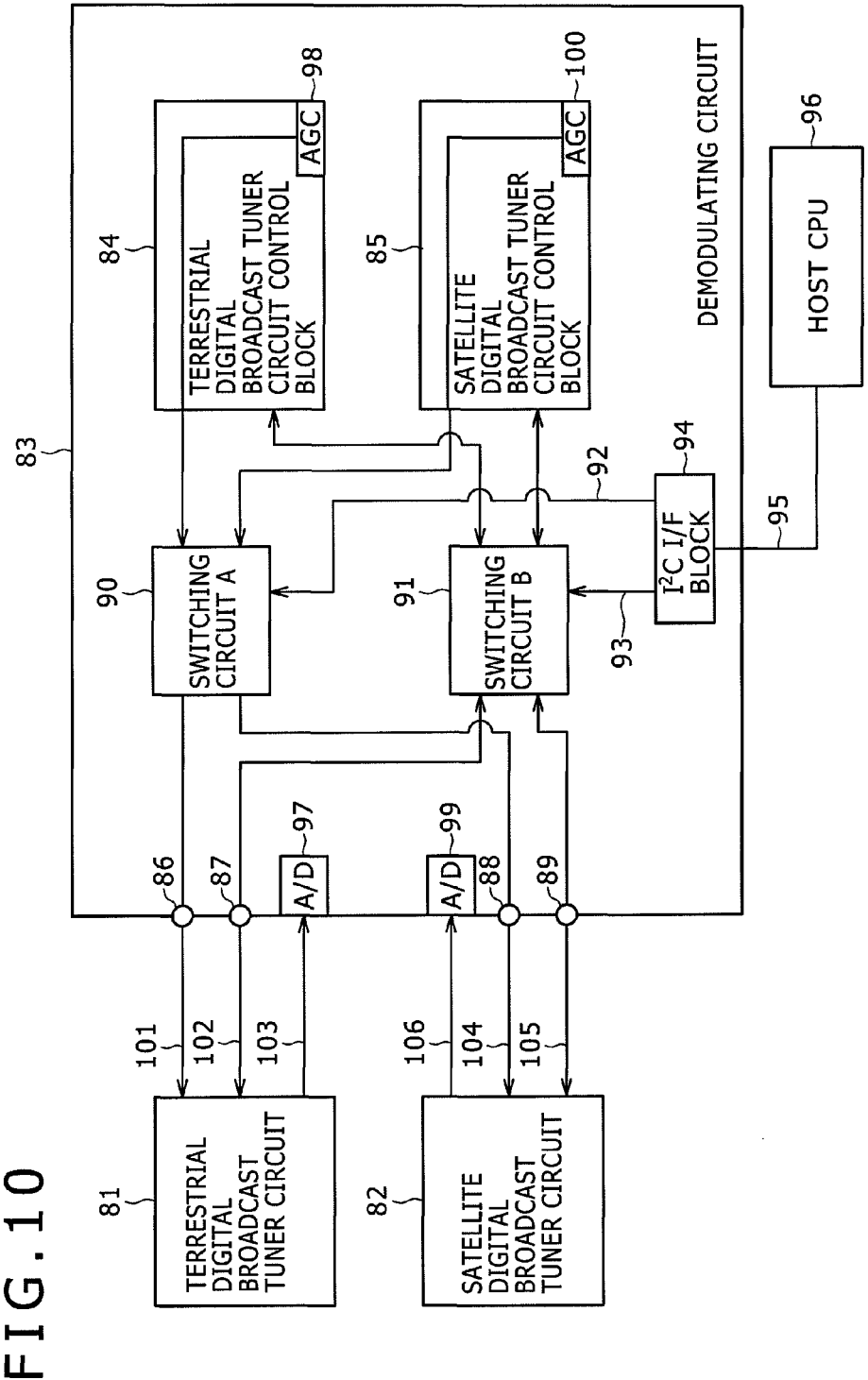
FIG. 10 is a schematic diagram illustrating a tuner circuit and a demodulating circuit of still another digital broadcast receiving apparatus.

Referring to FIG. 10, there is shown a schematic diagram of a tuner circuit and a demodulating circuit of a digital broadcast receiving apparatus practiced as still another embodiment of the invention. The digital broadcast receiving apparatus shown in FIG. 10 has three circuits, a terrestrial digital broadcast tuner circuit 81, a satellite digital broadcast tuner circuit 82, and a demodulating circuit 83 configured to demodulate IF signals 103 and 106 that are reception signals of these two schemes.

These two reception signals IF 103 and 106 are both analog signals, so that these signals are converted into digital signals by an A/D converting circuits 97 and 99 in the preprocessing of the demodulating circuit 53. The demodulating circuit 83 demodulates these digital signals. The demodulating circuit 83 has a terrestrial digital broadcast tuner circuit control block 84 and a satellite digital broadcast tuner circuit control block 85 for executing control inside the circuit.

At this time, the terrestrial digital broadcast tuner circuit control block 84 and the satellite digital broadcast tuner circuit control block 85 each have AGCs (Automatic Gain Controls) 98 and 100. AGC signals from the AGCs 98 and 100 are fed back to the terrestrial digital broadcast tuner circuit 81 and the satellite digital broadcast tuner circuit 82 via terminals 86 and 88, respectively. The AGC signals are passed to an intermediate-frequency amplifying circuit in the terrestrial digital broadcast tuner circuit 81 and an intermediate-frequency amplifying circuit in the satellite digital broadcast tuner circuit 82, respectively, to be automatically optimized in amplification. This IF signal amplitude optimizing control provides an effect of widening the dynamic range DR of the A/D converting circuits 97 and 99.

Serial communications signals 102 and 105, such as various setting data, control the selection or passband of the terrestrial digital broadcast tuner circuit 81 and the satellite digital broadcast tuner circuit 82 via a switching circuit B (91), a terminal B (87), and a terminal D (89).

Also, the serial communications signals 102 and 105 are bidirectionally communicable between the terrestrial digital broadcast tuner circuit 81 and the satellite digital broadcast tuner circuit 82 and the terrestrial digital broadcast tuner circuit control block 84 and the satellite digital broadcast tuner circuit control block 85.

The digital broadcast receiving apparatus shown in FIG. 10 has an I²C I/F block 94 and a host CPU 96 in addition to the demodulating circuit 83 capable of the reception signals of two schemes, terrestrial digital broadcasting and satellite digital broadcasting, the terrestrial digital broadcast tuner circuit 81, and the satellite digital broadcast tuner circuit 82. The I²C I/F block 94 and the host CPU 96 each have a function of switching the connection states of switching circuit A (90) and switching circuit B (91).

The demodulating circuit 83 has the terrestrial digital broadcast tuner circuit control block 84, the satellite digital tuner circuit control block 85, switching circuit A (90), switching circuit B (91), and the I²C I/F block 94. Switching circuit A (90) and switching circuit B (91) are connected to switching signal A (92), switching signal B (93), and the I²C I/F block 94. The I²C I/F block 94 is connected to the host CPU 96 via I²C communication 95.

Terminal A (86) and terminal C (88) of the demodulating circuit 83 output AGC signals 101 and 104 that are fed back to the terrestrial digital broadcast tuner circuit 81 and the satellite digital broadcast tuner circuit 82, respectively.

Terminal B (87) and terminal D (89) of the demodulating circuit 83 are for serial communications signals 102 and 105 that are fed back to the terrestrial digital broadcast tuner circuit 81 and the satellite digital broadcast tuner circuit 82, respectively.

The following describes a relation between tuner circuit arrangement and terminal position. As shown in FIG. 10, the relation becomes as follows if the terrestrial digital broadcast tuner circuit 81 is arranged near terminal A (86) and terminal B (87) and the satellite digital broadcast tuner circuit 82 is arranged near terminal C (88) and terminal D (89).

Referring to FIG. 15, there is shown a relation between control signals switched by the switching signal from the I²C I/F block and output terminals by the setting from the host CPU. In this case, the terminal states of terminal A (86), terminal B (87), terminal C (88), and terminal D (89) can be determined via switching signal A (92) and switching signal B (93) set to the I²C I/F block 94 by the I²C communication 95 from the host CPU 96, such as "1" of No. 141 in FIG. 15, thereby facilitating the wiring of the AGC signals 101 and 104 and the serial communications signal 102 and 105 for the two tuner circuits.

Figure 11:
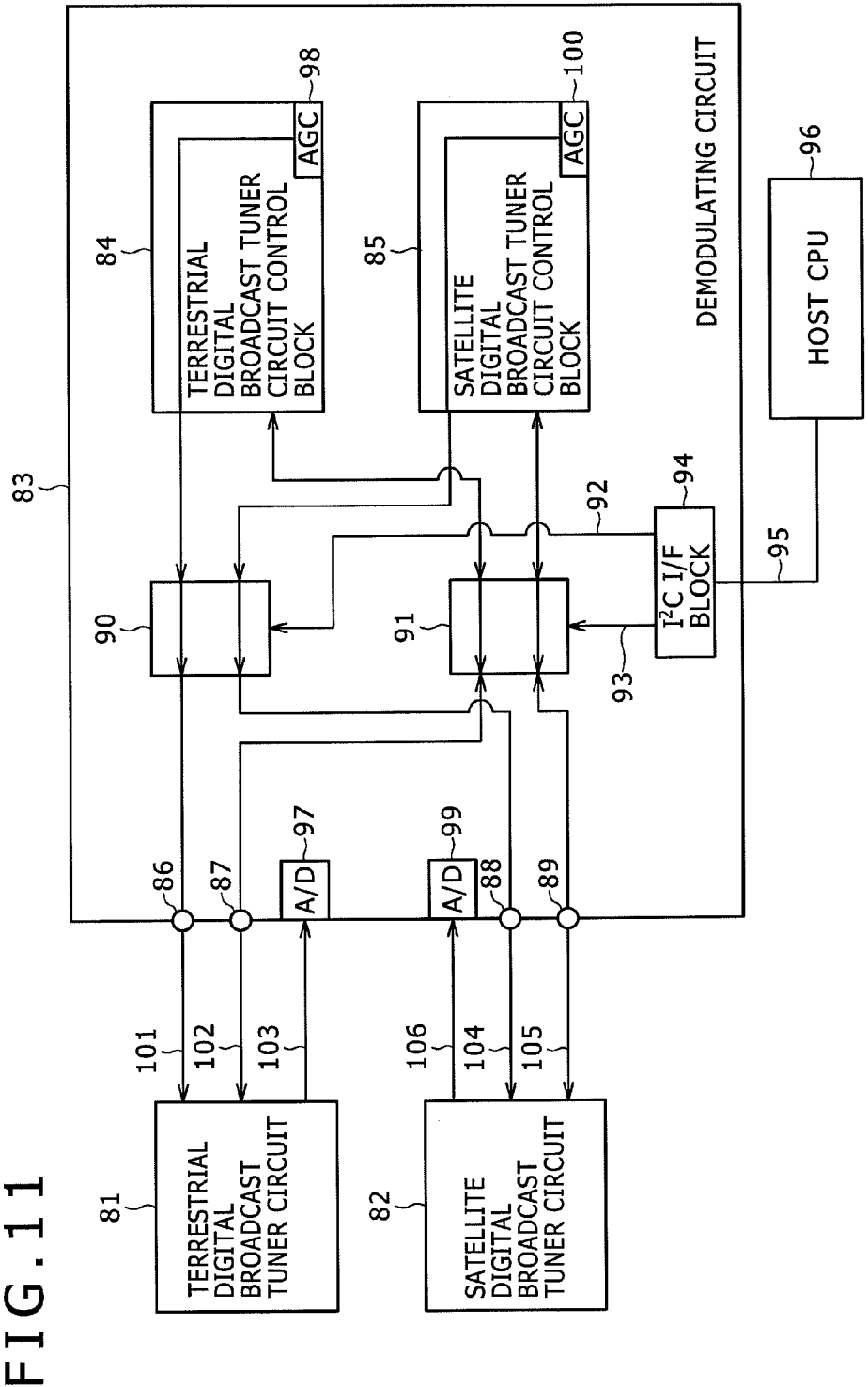
FIG. 11 is a diagram illustrating a switching state of another demodulating circuit.

FIG. 11 shows a connection state of switching circuit A (90) and switching circuit B (91) at that time. As shown in FIG. 11, in switching circuit A (90), an AGC 98 is connected to terminal A (86) and an AGC 100 is connected to the terminal C (88). In switching circuit B (91), the terrestrial digital broadcast tuner circuit control block 84 is connected to terminal B (87) and the satellite digital broadcast tuner circuit control block 85 is connected to terminal D (99).

If the terrestrial digital broadcast tuner circuit 81 is arranged near terminal A (86) and terminal B (87) and the satellite digital broadcast tuner circuit 82 is arranged near terminal C (88) and terminal D (89), the following configuration is obtained.

In this case, the switching state of switching circuit A (90) and switching circuit B (91) is set via switching signal A (92) and switching signal B (93) set to the I²C I/F block 94 by I²C communication 95 from the host CPU 96, such as "4" of No. 141 in FIG. 15.

Namely, if switching signal A (92) is "1" and switching signal B (93) is also "1," terminal A (86) provides an AGC signal for satellite digital broadcast tuner, terminal B (87) provides a serial communications signal for satellite digital broadcast tuner, terminal C (88) provides an AGC signal for terrestrial digital broadcast tuner, and terminal D (89) provides a serial communications signal for terrestrial digital broadcast tuner.

Consequently, the terminal state of terminal A (86), terminal B (87), terminal C (88), and terminal D (89) can be determined, thereby facilitating the wiring of the AGC signals 101 and 104 and the serial communications signals 102 and 105 for the two tuner circuits.

Figure 12:
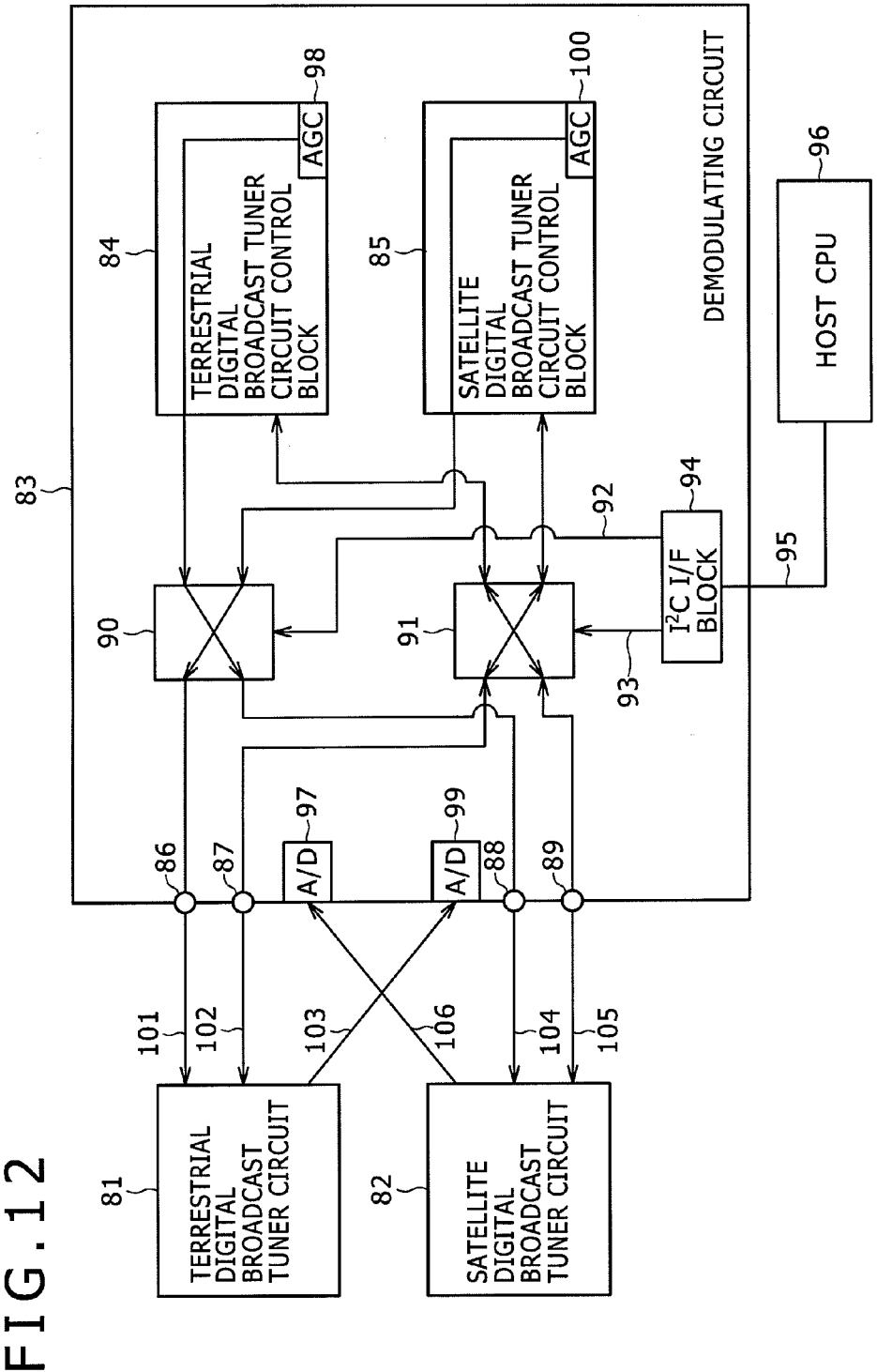
FIG. 12 is a diagram illustrating another switching state of the demodulating circuit shown in FIG. 11.
Figure 16:
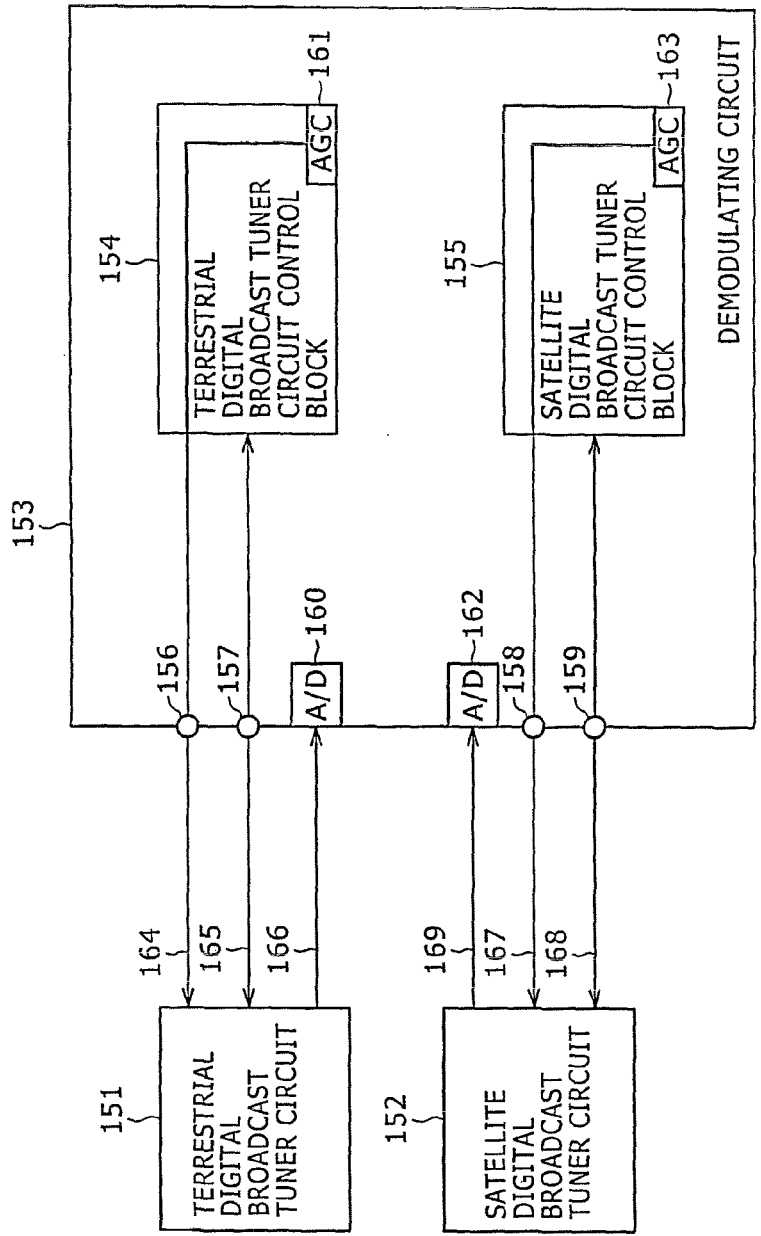
FIG. 16 is a schematic diagram illustrating a tuner circuit and a demodulating circuit of a related-art satellite digital broadcast receiving apparatus.
Figure 17:
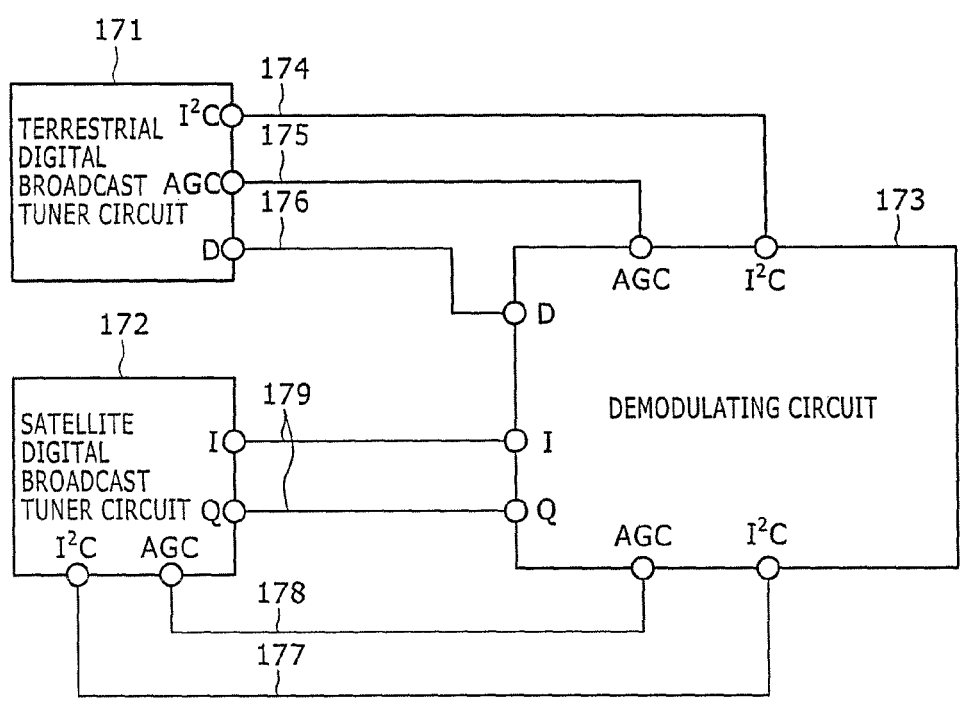
FIG. 17 is a schematic diagram illustrating another related-art digital broadcast receiving apparatus.
Figure 18:
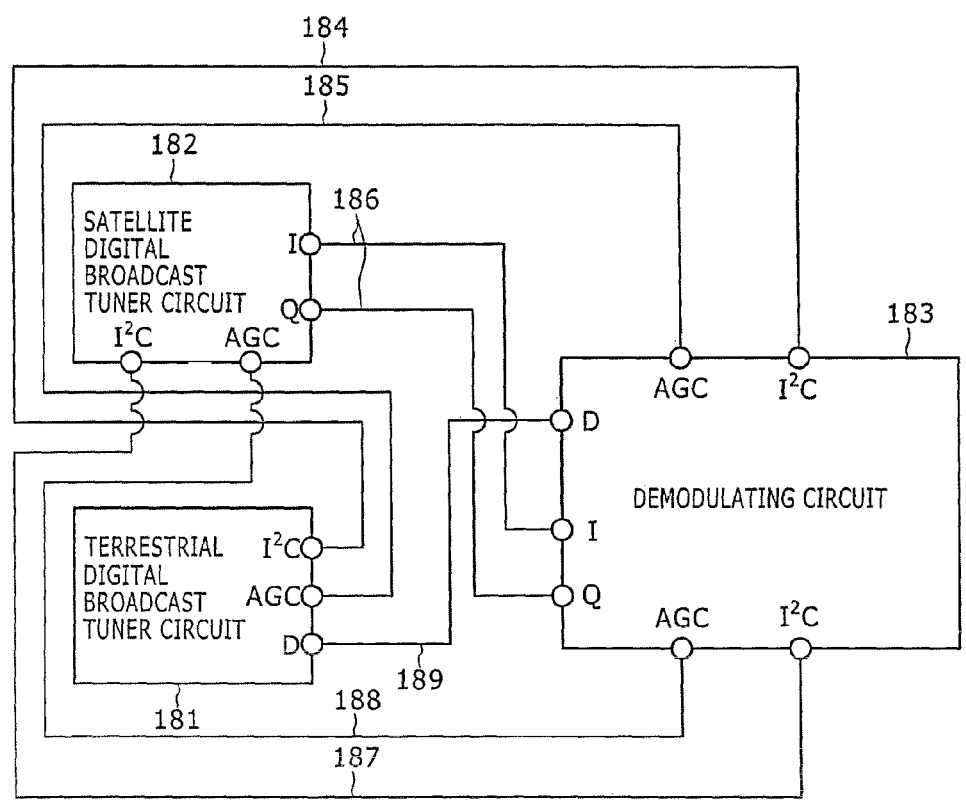
FIG. 18 is a schematic diagram illustrating still another related-art digital broadcast receiving apparatus.

A switching connection state of switch circuit A (90) and switching circuit B (91) at that time is shown in FIG. 12. As shown in FIG. 12, in switching circuit A (90), the AGC 98 is connected to terminal C (88) and the AGC 100 is connected to terminal A (86). In switching circuit B (91), the terrestrial digital broadcast tuner circuit control block 84 is connected to terminal D (89) and the satellite digital broadcast tuner circuit control block 85 is connected to terminal B (87).

Consequently, by setting the switching state of switching circuit A (90) and switching circuit B (91) via switching signal A (92) and switching signal B (93) set to the I²C I/F block 94 by I²C communication 95 from the host CPU 96, the terminal states of terminal A (86), terminal B (87), terminal C (88), and terminal D (89) can be determined, thereby facilitating the wiring of the AGC signals 101 and 104 and serial communications signals 102 and 105 for the two tuner circuits.

The following describes a configuration in which the satellite digital broadcast tuner circuit 82 and the terrestrial digital broadcast tuner circuit 81 are arranged in a horizontal manner. If the satellite digital broadcast tuner circuit 82 is arranged near terminal A (86) and terminal D (89) and the terrestrial digital broadcast tuner circuit 81 is arranged near terminal B (87) and terminal C (88), the following configuration is obtained. In this configuration, the satellite digital broadcast tuner circuit 82 is arranged to the left of the terrestrial digital broadcast tuner circuit 81. Also, in this configuration, the terminals of the satellite digital broadcast tuner circuit 82 are positioned at the upper and lower sides thereof, and the terminals of the satellite digital broadcast tuner circuit 81 are positioned at the right side thereof. This switching connection state is substantially the same as the switching connection state of circuit A (30) and switching circuit B (31) when the satellite digital broadcast tuner circuit 22 is arranged to the left of the terrestrial digital broadcast tuner circuit 21 as shown in FIG. 6.

In this case, the switching state of switching circuit A (90) and switching circuit B (91) is set via switching signal A (92) and switching signal B (93) set to the I²C I/F block 94 by I²C communication 95 from the host CPU 96, such as "2" of No. 141 in FIG. 15.

Namely, if switching signal A (92) is "1" and switching signal B (93) is "0," then terminal A (86) provides an AGC signal for satellite digital broadcast tuner, terminal B (87) provides a serial communications signal for terrestrial digital broadcast tuner, terminal C (88) provides an AGC signal for terrestrial digital broadcast tuner, and terminal D (89) provides a serial communications signal for satellite digital broadcast tuner.

Consequently, the terminal states of terminal A (86), terminal B (87), terminal C (88), and terminal D (89) can be determined, thereby facilitating the wiring of the AGC signals 101 and 104 and the serial communications signals 102 and 105.

If the satellite digital broadcast tuner circuit 82 is arranged near terminal B (87) and terminal C (88) and the terrestrial digital broadcast tuner circuit 81 is arranged near terminal A (86) and terminal D (89), the following configuration is obtained. In this configuration, the satellite digital broadcast tuner circuit 82 is arranged to the right of the terrestrial digital broadcast tuner circuit 81. Also, in this configuration, the terminals of the terrestrial digital broadcast tuner circuit 81 are positioned at the upper and lower sides thereof and the terminals of the satellite digital broadcast tuner circuit 82 are positioned at the right side thereof. This switching connection state is reverse to the arrangement of the satellite digital broadcast tuner circuit 22 and the terrestrial digital broadcast tuner circuit 21 shown in FIG. 6.

In this case, the switching state of switching circuit A (90) and switching circuit B (91) is set via switching signal A (92) and switching signal B (93) set to the I²C I/F block 94 by I²C communication 95 from the host CPU 96, such as "3" of No 141 in FIG. 15.

Namely, if switching signal A (92) is "0" and switching signal B (93) is "1," then terminal A (86) provides an AGC signal for terrestrial digital broadcast tuner, terminal B (87) provides a serial communications signal for satellite digital broadcast tuner, terminal C (88) provides an AGC signal for satellite digital broadcast tuner, and terminal D (89) provides a serial communications signal for terrestrial digital broadcast tuner.

Consequently, the terminal states of terminal A (86), terminal B (87), terminal C (88), and terminal D (89) can be determined, thereby facilitating the wiring of the AGC signals 101 and 104 and the serial communications signals 102 and 105.

According to the above-mentioned embodiments of the invention, a terrestrial digital broadcast tuner circuit, a satellite digital broadcast tuner circuit, and a demodulating circuit can be arranged without restraint. Consequently, if the terminals of each of these circuits are different in orientation due to changed arrangements of these circuits, the control signals that are transferred between the three circuits can be wired without restraint.

In addition, the above-mentioned embodiments of the invention significantly enhance the selectivity in wiring, thereby contributing to the reduced size and cost of an entire system.

While preferred embodiments of the present invention have been described using specific terms, such description is for illustrative purpose only, and it is to be understood that changes and variations may be made without departing from the spirit or scope of the following claims.

What is claimed is:

1. A digital broadcast receiving apparatus configured to receive terrestrial digital television broadcasting and satellite digital broadcasting, comprising:
   a terrestrial digital tuner configured to receive terrestrial digital television broadcasting;
   a satellite digital tuner configured to receive satellite digital broadcasting;
   a demodulating block configured to demodulate a reception signal of said terrestrial digital television broadcasting with an output supplied from said terrestrial digital tuner, and, at the same time, demodulate a reception signal of said satellite digital broadcasting with an output supplied from said satellite digital tuner, said demodulating block including a first terminal connected to said terrestrial digital tuner establishing at least communication from said demodulating block to said terrestrial digital tuner and a second terminal connected to said satellite digital tuner establishing at least communication from said demodulating block to said satellite digital tuner;

a terrestrial digital tuner control block, included in said demodulating block, configured to control said terrestrial digital tuner via a control signal supplied from said terrestrial digital tuner control block and applied to one of said first or second terminals of said demodulating block;

a satellite digital tuner control block, included in said demodulating block, configured to control said satellite digital tuner via a control signal supplied from said satellite digital tuner control block and applied to a remaining one of said first or second terminals of said demodulating block;

a switching block configured to switch application of, inside said demodulating block, said control signal supplied from said terrestrial digital tuner control block and said control signal supplied from said satellite digital tuner control block between said first and second terminals of said demodulating block in accordance with a positional arrangement of said terrestrial digital tuner and said satellite digital tuner relative to said demodulating block; and an additional switching block, wherein said demodulating block further includes a third terminal connected to said terrestrial digital tuner establishing at least communication from said demodulating block to said terrestrial digital tuner and a fourth terminal connected to said satellite digital tuner establishing at least communication from said demodulating block to said satellite digital tuner, and said additional switching block is configured to switch application of, inside said demodulating block, a second control signal supplied from said terrestrial digital tuner control block and a second control signal supplied from said satellite digital tuner control block between said third and fourth terminals of said demodulating block in accordance with said positional arrangement of said terrestrial digital tuner and said satellite digital tuner relative to said demodulating block.

2. The digital broadcast receiving apparatus according to claim 1, wherein a control block configured to set a switching state of said switching block is arranged outside said demodulating block for setting a switching state based on preset types of said terrestrial digital tuner and said satellite digital tuner to said control block.

3. The digital broadcast receiving apparatus according to claim 2, wherein terminal positions, in which said control signals are entered, change in accordance with types of said terrestrial digital tuner and said satellite digital tuner.

4. The digital broadcast receiving apparatus according to claim 1, wherein a setting terminal configured to set a switching state of said switching block is arranged inside said demodulating block and said setting terminal is applied with an electrical potential for setting a preset switching state of said terrestrial digital tuner and said satellite digital tuner.

5. The digital broadcast receiving apparatus according to claim 1, wherein a setting block configured to set a switching state of said switching block is arranged inside said demodulating block and a control block configured to control setting by said setting block is arranged outside said demodulating block.

6. The digital broadcast receiving apparatus according to claim 1, wherein said switching block is arranged in plural in accordance with the number of types of said control signal.

7. The digital broadcast receiving apparatus according to claim 1, wherein said control signals are automatic gain control signals for adjusting a dynamic range at a time when said terrestrial digital television broadcasting reception signal is converted into a digital signal and said satellite digital broadcasting reception signal is converted into a digital signal for controlling one of selection and passband of said terrestrial digital tuner and said satellite digital tuner.

8. The digital broadcast receiving apparatus according to claim 1, wherein said control signals include communications information that includes setting information supplied from said terrestrial digital tuner control block and said satellite digital tuner control block.

9. The digital broadcast receiving apparatus according to claim 1, wherein said control signals are automatic gain control signals for adjusting a dynamic range at a time when said terrestrial digital television broadcasting reception signal is converted into a digital signal and said satellite digital broadcasting reception signal is converted into a digital signal for controlling one of selection and passband of said terrestrial digital tuner and said satellite digital tuner.

10. The digital broadcast receiving apparatus according to claim 9, wherein said second control signals include communications information that includes setting information supplied from said terrestrial digital tuner control block and said satellite digital tuner control block.

* * * * *